(12) United States Patent
Gorman

(10) Patent No.: US 12,056,647 B2
(45) Date of Patent: Aug. 6, 2024

(54) COORDINATED CONVEYERS IN AN AUTOMATED SYSTEM

(71) Applicant: Team Conveyer Intellectual Properties, LLC, Del Mar, CA (US)

(72) Inventor: John G. Gorman, Del Mar, CA (US)

(73) Assignee: Team Conveyer Intellectual Properties, LLC, Del Mar, CA (US)

(*) Notice: Subject to any disclaimer, the term of this patent is extended or adjusted under 35 U.S.C. 154(b) by 100 days.

(21) Appl. No.: 17/963,985

(22) Filed: Oct. 11, 2022

(65) Prior Publication Data

US 2023/0035815 A1   Feb. 2, 2023

Related U.S. Application Data

(63) Continuation of application No. 16/828,863, filed on Mar. 24, 2020, now Pat. No. 11,498,764.
(Continued)

(51) Int. Cl.
*G06F 7/00* (2006.01)
*B65G 1/137* (2006.01)
(Continued)

(52) U.S. Cl.
CPC ....... *G06Q 10/0639* (2013.01); *B65G 1/1371* (2013.01); *B65G 1/1378* (2013.01);
(Continued)

(58) Field of Classification Search
CPC ............... G06Q 10/0639; G06Q 10/04; G06Q 10/06315; G06Q 10/087; G06Q 20/18;
(Continued)

(56) References Cited

U.S. PATENT DOCUMENTS

| 367,129 A | 7/1887 | Bean |
| 4,224,979 A * | 9/1980 | Rosin ............... B22D 47/00 |
| | | 164/137 |

(Continued)

FOREIGN PATENT DOCUMENTS

| JP | 05246505 A | 9/1993 |
| JP | 2012229091 A | 11/2012 |

(Continued)

OTHER PUBLICATIONS

International Search Report and Written Opinion for PCT International Application No. PCT/US20202/023718, dated Jun. 12, 2020, 23 pages.

(Continued)

*Primary Examiner* — Yolanda R Cumbess
(74) *Attorney, Agent, or Firm* — Procopio, Cory, Hargreaves & Savitch LLP

(57) ABSTRACT

Coordinated conveyors in an automated system. In an embodiment, the system comprises transport conveyor(s) and storage conveyors, wherein each storage conveyor comprises a plurality of segments configured to hold at least one item, and a portion that is aligned with a portion of a transport conveyor, such that items are moveable from the storage conveyor to the transport conveyor. Software module(s), executed by a processor, receive an instruction to collect item(s) at a single destination location, and, for each of the item(s), identify a segment on a storage conveyor on which the item is held, control that storage conveyor to align the segment with the transport conveyor, move the item from the segment onto the transport conveyor, control the transport conveyor to align the item with the destination location, and move the item from the transport conveyor to the destination location.

20 Claims, 10 Drawing Sheets

Related U.S. Application Data

(60) Provisional application No. 62/898,414, filed on Sep. 10, 2019, provisional application No. 62/832,701, filed on Apr. 11, 2019.

(51) Int. Cl.
*B65G 11/02* (2006.01)
*B65G 43/00* (2006.01)
*G06K 7/10* (2006.01)
*G06Q 10/04* (2023.01)
*G06Q 10/0631* (2023.01)
*G06Q 10/0639* (2023.01)
*G06Q 10/087* (2023.01)
*G06V 10/22* (2022.01)

(52) U.S. Cl.
CPC ............ *B65G 11/023* (2013.01); *B65G 43/00* (2013.01); *G06K 7/10415* (2013.01); *G06Q 10/04* (2013.01); *G06Q 10/06315* (2013.01); *G06Q 10/087* (2013.01); *G06V 10/22* (2022.01); *B65G 2203/0216* (2013.01); *G06V 2201/06* (2022.01)

(58) Field of Classification Search
CPC .. G06Q 20/203; B65G 1/1371; B65G 1/1378; B65G 11/023; B65G 43/00; B65G 2203/0216; B65G 1/0485; B65G 2201/0235; B65G 43/08; G06K 7/10415; G06V 10/22; G06V 2201/06; G07F 9/006; G07F 9/105; G07F 11/26; G07F 11/58
USPC ................................. 700/213, 223, 229–230
See application file for complete search history.

(56) References Cited

U.S. PATENT DOCUMENTS

| | | | |
|---|---|---|---|
| 4,715,920 A * | 12/1987 | Ruppman | B03B 9/061 83/155.1 |
| 4,958,716 A * | 9/1990 | Matsuo | B65G 54/02 198/465.1 |
| 9,604,787 B1 | 3/2017 | Baek | |
| 10,689,200 B1 * | 6/2020 | Lwali | B65G 47/50 |
| 2005/0133340 A1 | 6/2005 | Horn | |
| 2007/0087429 A1 | 4/2007 | Tanimoto et al. | |
| 2007/0261997 A1 | 11/2007 | Cassady et al. | |
| 2008/0181753 A1 | 7/2008 | Bastian et al. | |
| 2010/0316468 A1 | 12/2010 | Lert et al. | |
| 2013/0015675 A1 | 1/2013 | Pickard et al. | |
| 2015/0095254 A1 | 4/2015 | Naber et al. | |
| 2016/0244184 A1 | 8/2016 | Alderman et al. | |
| 2017/0200248 A1 | 7/2017 | Murphy | |
| 2017/0349385 A1 | 7/2017 | Moroni et al. | |
| 2017/0269112 A1 | 9/2017 | Gerstel | |
| 2017/0273193 A1 | 9/2017 | Sari et al. | |
| 2017/0283185 A1 | 10/2017 | Christopher et al. | |
| 2018/0135093 A1 | 5/2018 | Ashby et al. | |
| 2018/0311704 A1 | 11/2018 | Gil | |
| 2019/0332096 A1 | 10/2019 | Porter et al. | |
| 2020/0156868 A1 | 5/2020 | Bidram et al. | |
| 2020/0324974 A1 | 10/2020 | Gorman | |

FOREIGN PATENT DOCUMENTS

| | | |
|---|---|---|
| JP | 2015042589 A | 3/2015 |
| KR | 20130139346 A | 12/2013 |
| WO | 2015045181 A1 | 4/2015 |

OTHER PUBLICATIONS

Smith et al., "Abbott AxSYM Random and Continuous Access Immunossay Systam for Improved Workflow in the Clinical Laboratory," Clinical Chemistry, vol. 39, No. 10, 1993, pp. 2063-2069, 7 pages.

* cited by examiner

COORDINATED CONVEYERS IN AN AUTOMATED SYSTEM

CROSS-REFERENCE TO RELATED APPLICATIONS

This application is a continuation of U.S. patent application Ser. No. 16/828,863, filed on Mar. 24, 2020, which claims priority to U.S. Provisional Patent App. No. 62/832,701, filed on Apr. 11, 2019, and U.S. Provisional Patent App. No. 62/898,414, filed on Sep. 10, 2019, which are all hereby incorporated herein by reference as if set forth in full.

BACKGROUND

Field of the Invention

The embodiments described herein are generally directed to automation, and, more particularly, to the coordination of a plurality of conveyors within an automated system.

Description of the Related Art

Civilization has used the same basic method of storing goods from the Stone Age to modern times: carry, stow, pick, and carry (CSPC). This storage method has persisted because of the extraordinary versatility of human locomotion. Human arms with their cooperating prehensile hands, remarkable haptic sensing, and visual coordination, managed by a purposeful intelligent processor, the human brain, makes CSPC efficient.

Refrigerators, freezers, cupboards, lockers, drawers, and closets are common examples of CSPC systems, and represent subsets of the storage systems in every household. In small stores, supermarkets, pickup centers, and large fulfillment centers, the process is the same, but at varying scales. CSPC systems scale from clinical laboratory testing, in which samples, reagents, and reaction vessels are stowed and manually or automatically picked, to household storage, retail shops, and supermarket, to warehouses and giant retail fulfillment centers. The underlying schema is exactly the same in all of these systems. It is characterized by the fact that in all of these systems, storage is on fixed shelves.

For example, all fulfillment systems employ the same process. In a massive fulfillment center, there are hundreds of human stowers and pickers. During an average shift, stowers may walk up to 13 miles with their carts and stepladders to stow instances of 160,000 stock keeping units (SKUs) on acres of shelving. To assemble and deliver shopping lists, hundreds of human pickers, also walking up to 13 miles per shift with their carts and stepladders, collect customer shopping lists into totes, which go to a team of packers.

Similarly, in a traditional shopping trip, a customer makes a shopping list, drives to a store, finds, selects, picks items from fixed shelves, and places them into a shopping cart, negotiates checkout, bags items, moves the bagged items to the customer's car, loads the bagged items into the car, and drives home. In the past, stores have been happy to let customers do all of this carrying and picking work themselves. However, the rise in online shopping has forced a sea-change by focusing on the convenience of customers in the market for groceries and other consumer products. Specifically, driven by the convenience of online shopping, brick-and-mortar stores are now taking on many of the tasks involved in the traditional shopping trip.

Analytically, most of these tasks simply involve moving individual items for sale from one space to another space and recording ownership transfers and associated charges. In most cases, this movement of items is still performed manually by either store personnel or customers. While there is significant potential for automation of CSPC, the current automation approach in fulfillment systems is to employ automation to assist human stowers, pickers, and packers, to speed up their throughput, but not to replace them. Dozens of companies now manufacture automated mobile manipulating robots (AMRs), autonomous guided vehicles (AGVs), and vision guided robots (VGRs). For example, Amazon™ is currently engaged in a multi-billion dollar automation program. In around 50 of their 185 large fulfillment centers worldwide, they employ 200,000 "Roomba"-style AMRs that pick up 48" sections or stacks of storage shelves and take them to stowers and pickers to speed up their work by reducing walk time. This has resulted in more than doubling item throughput on ten-hour shifts, but imposes grueling work conditions on stowers and pickers, who must man a station to hourly place or pick up to 300 items in carts, up to 50 pounds in weight, stored high and low, on fixed shelves from the floor or a step ladder. Other automation projects for order fulfillment are underway by other companies using similar robotic vehicles. All of these systems still require human stowers and pickers, because AMRs with grippers of adequate versatility to pick items of varied sizes and shapes from stacks are not yet available, and are estimated to be at least ten years away.

In addition, complex navigation is required for the vehicles used by these fulfillment systems. The vehicles must avoid collisions and items falling out during movement (e.g., rotation, acceleration, deceleration, etc.). Furthermore, the vehicles need to be recharged, serviced, and eventually retired. There is also a safety concern. Many autonomous vehicles have to operate in a large open area, and only special maintenance workers, wearing special jackets that the autonomous vehicles can detect and avoid, are permitted within the area.

On the micro scale, the same CSPC principles apply. For example, the same CSPC system that is used in fulfillment systems is used in automated diagnostic instruments. Samples, reagents, and reaction vessels are stowed in automated instruments. To perform individual tests, carefully identified items have to be picked and carried into and out of analytic stations. Conventional diagnostic instruments utilize complex robotics to move items internally. Such robotics generally requires multiple mechanical systems that perform complex highly controlled movements, often in three dimensions. In addition, items must generally be moved between different areas within the automated system (e.g., by robotic arms with grippers) that are responsible for different processes. Thus, the cost of building and maintaining such systems can be prohibitively expensive.

In summary, the current approach to automation has been to mimic the human CSPC method, using robots to do the carrying, fixed shelves to do the stowing, and intricate robotic arms with gripper 'hands' to do the picking. Accordingly, there is the need for a fundamental change in the CSPC approach to automation, which preferably does not rely on the complex transportation and mechanical robotics now being employed by conventional automated systems.

SUMMARY

Accordingly, systems, methods, and non-transitory computer-readable media are disclosed for providing and coordinating a plurality of conveyors within an automated system.

In an embodiment, a system is disclosed that comprises: at least one transport conveyor; a plurality of storage conveyors, wherein each of the plurality of storage conveyors comprises a plurality of segments configured to hold at least one item, and wherein each of the plurality of storage conveyors comprises a portion that is aligned with a portion of the at least one transport conveyor, such that items are moveable from the storage conveyor to the at least one transport conveyor; at least one hardware processor; and one or more software modules configured to, when executed by the at least one hardware processor, receive an instruction to collect one or more items at a single destination location, and, for each of the one or more items, identify a segment on one of the plurality of storage conveyors on which the item is held, control the one storage conveyor to align the identified segment with the at least one transport conveyor, move the item from the identified segment onto the at least one transport conveyor, control the at least one transport conveyor to align the item with the single destination location, and move the item from the at least one transport conveyor to the single destination location.

In an embodiment, the at least one hardware processor may be configured to independently control each of the at least one transport conveyor and the plurality of storage conveyors to move independently from each other. The at least one transport conveyor and the plurality of storage conveyors may be configured to move in two directions. Each of the plurality of storage conveyors may be oriented to move in a direction that is orthogonal to a direction of movement of the portion of the at least one transport conveyor with which the storage conveyor is aligned. Each of the plurality of storage conveyors may comprise a vertical loop, wherein a holding surface of each of the plurality of storage conveyors is positioned above a holding surface of the at least one transport conveyor, and wherein moving the item from the identified segment onto the at least one transport conveyor comprises moving the identified segment towards the at least one transport conveyor until the item drops off the one storage conveyor onto the at least one transport conveyor. The system may further comprise a chute between the portion of each of the plurality of storage conveyors that is aligned with the portion of the at least one transport conveyor and the at least one transport conveyor, wherein dropping the item off the one storage conveyor onto the at least one transport conveyor comprises dropping the item into a chute that provides a downward slide path to the at least one transport conveyor. The portion of each of the plurality of storage conveyors that is aligned with the portion of the at least one transport conveyor may move in a direction that is parallel to a direction of movement of the portion of the at least one transport conveyor with which the portion of the storage conveyor is aligned. Each of the plurality of storage conveyors may comprise a horizontal loop, wherein a holding surface of each of the plurality of storage conveyors is positioned above a holding surface of the at least one transport conveyor, and wherein moving the item from the identified segment onto the at least one transport conveyor comprises pushing the item off the identified segment into a chute that provides a downward slide path towards the at least one transport conveyor. Moving the item from the identified segment onto the at least one transport conveyor further may comprise: waiting for the pushed item to slide into a bin at the end of the downward slide path; and pushing the bin onto the holding surface of the at least one transport conveyor.

In an embodiment, the at least one transport conveyor comprises a plurality of nested conveyors. The plurality of storage conveyors may be arranged into a plurality of separate storage systems, wherein each of the plurality of separate storage systems comprises two or more of the plurality of storage conveyors. Each of the plurality of separate storage systems may comprise at least one of the plurality of storage conveyors stacked over at least another one of the plurality of storage conveyors.

Each of the plurality of storage conveyors may be configured to move in two directions, wherein the one or more software modules are configured to, when executed by the at least one hardware processor: determine in which of the two directions to move the one storage conveyor so as to minimize movement; and control the one storage conveyor to move in the determined direction. Each of the at least one transport conveyor and the plurality of storage conveyors may be configured to stop at each of a plurality of indexed positions.

The one storage conveyor may comprise a cooling component that cools a holding surface of the one storage conveyor, wherein the one or more software modules, when executed by the at least one processor, control the cooling component to cool the holding surface of the one storage conveyor. The one storage conveyor may comprise a warming component that warms a holding surface of the one storage conveyor, wherein the one or more software modules, when executed by the at least one processor, control the warming component to warm the holding surface of the one storage conveyor. An ambient temperature of the one storage conveyor may be controllable, wherein the one or more software modules, when executed by the at least one processor, control the ambient temperature of the one storage conveyor to maintain a temperature or remain within a temperature range.

In an embodiment, the system further comprises one or more reading stations comprising a reader device configured to read a characteristic of an item held on a segment of at least one of the at least one transport conveyor or the plurality of storage conveyors. The reader device may comprise a camera configured to capture an image of a machine-readable indicium on the read item, wherein the one or more software modules are configured to, when executed by the at least one hardware processor: identify the read item from the image; identify the segment on which the read item is held; and map an identifier of the read item to an identifier of the identified segment. The identifier of the identified segment may comprise a surface vector that uniquely identify a location on a surface of the conveyor on which the read item is held, wherein the one or more software modules are configured to, when executed by the at least one hardware processor, map the surface vector to a ground vector that uniquely identify a location of the identified segment within an automated system. In an embodiment, the system further comprises one or more reading stations comprising a reader device configured to read a machine-readable indicium on a segment of at least one of the at least one transport conveyor or the plurality of storage conveyors, wherein the one or more software modules are configured to: identify the segment based on the read machine-readable indicium; and determine a position of the identified segment based on a position of the reader device.

The system may further comprise: a building that encloses the at least one transport conveyor and the plurality of storage conveyors; and a destination system comprising a plurality of destination locations that are accessible to the at least one transport conveyor. The destination system may comprise a plurality of lockers as the plurality of destination locations. The one or more software modules may be further configured to, when executed by the at least one hardware processor: receive the instruction to collect the one or more items from a web application via at least one network; and provide an identifier of the locker corresponding to the single destination location to the web application via the at least one network. The building may comprise a forty-foot shipping container, wherein the destination system is attachable to the shipping container and detachable from the shipping container.

In an embodiment, each of a plurality of entities is associated with a place-time identifier, wherein the plurality of entities comprises all items within the system, and wherein each place-time identifier for each entity comprises: a surface vector that identifies a relative location of the entity on a surface; and a time vector that identifies a time at which the entity is at the relative location identified in the surface vector. The one or more software modules may be configured to, for each of the items within the system, store each place-time identifier in association with its associated item, as the time vector changes, to create a log of every place-time identifier associated with each of the items within the system from a time at which the item enters the system until a time at which the item exits the system. The one or more software modules may be further configured to generate a measurement of an efficiency of the system based on the log. The one or more software modules may be configured to coordinate movement of the items within the system, based on the place-time identifiers associated with the items within the system, so as to optimize the measurement of efficiency. Each place-time identifier for each entity may further comprise a component vector that indicates a component on which the surface is located. Each place-time identifier for each entity may further comprise a ground vector that identifies a location of the entity relative to a ground underlying the system. The one or more software modules may be configured to store each place-time identifier in association with its associated entity, as the time vector and ground vector change over a period of time, to create a log of every place-time identifier associated with each of the plurality of entities over the period of time. Each place-time identifier for each entity may further comprise a what vector that identifies a type of the entity. The plurality of entities may further comprise all segments of the plurality of storage conveyors. The one or more software modules may be configured to determine the place-time identifier for each of the items within the system at a time at which the item is first stowed on one of the plurality of storage conveyors or the at least one transport conveyor. The one or more software modules may be configured to schedule movement of the items within the system based on the place-time identifiers associated with those items within the system. The system may further comprise a plurality of processing stations, wherein each of the plurality of processing stations is configured to process an accessible item on at least one of the plurality of storage conveyors or at least one transport conveyor, and wherein the one or more software modules are configured to coordinate movement of a set of two or more items, stored on the plurality of storage conveyors, based on the place-time identifiers associated with the two or more items, such that each of the two or more items simultaneously become accessible to a respective one of the plurality of processing stations at a pre-scheduled time. The one or more software modules may be configured to: track every item within the system; and automatically initiate restocking of each type of item, based on the tracking, by communicating with an external system of a supply chain.

In an embodiment, a method is disclosed that comprises using at least one hardware processor, within an automated system that comprises at least one transport conveyor and a plurality of storage conveyors, each of the plurality of storage conveyors comprising a plurality of segments configured to hold at least one item, and each of the plurality of storage conveyors comprising a portion that is aligned with a portion of the at least one transport conveyor such that items are moveable from the storage conveyor to the at least one transport conveyor, to: receive an instruction to collect one or more items at a single destination location; and, for each of the one or more items, identify a segment on one of the plurality of storage conveyors on which the item is held, control the one storage conveyor to align the identified segment with the at least one transport conveyor, move the item from the identified segment onto the at least one transport conveyor, control the at least one transport conveyor to align the item with the single destination location, and move the item from the at least one transport conveyor to the single destination location. The method may further include any of the functions or processes described with respect to the system above and herein.

In an embodiment, a non-transitory computer-readable medium having instructions stored therein is disclosed. The instructions, when executed by a processor of an automated system that comprises at least one transport conveyor and a plurality of storage conveyors, each of the plurality of storage conveyors comprising a plurality of segments configured to hold at least one item, and each of the plurality of storage conveyors comprising a portion that is aligned with a portion of the at least one transport conveyor such that items are moveable from the storage conveyor to the at least one transport conveyor, may cause the processor to: receive an instruction to collect one or more items at a single destination location; and, for each of the one or more items, identify a segment on one of the plurality of storage conveyors on which the item is held, control the one storage conveyor to align the identified segment with the at least one transport conveyor, move the item from the identified segment onto the at least one transport conveyor, control the at least one transport conveyor to align the item with the single destination location, and move the item from the at least one transport conveyor to the single destination location. The instructions may further cause the processor to perform any of the functions or processes described with respect to the system above and herein.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1A:
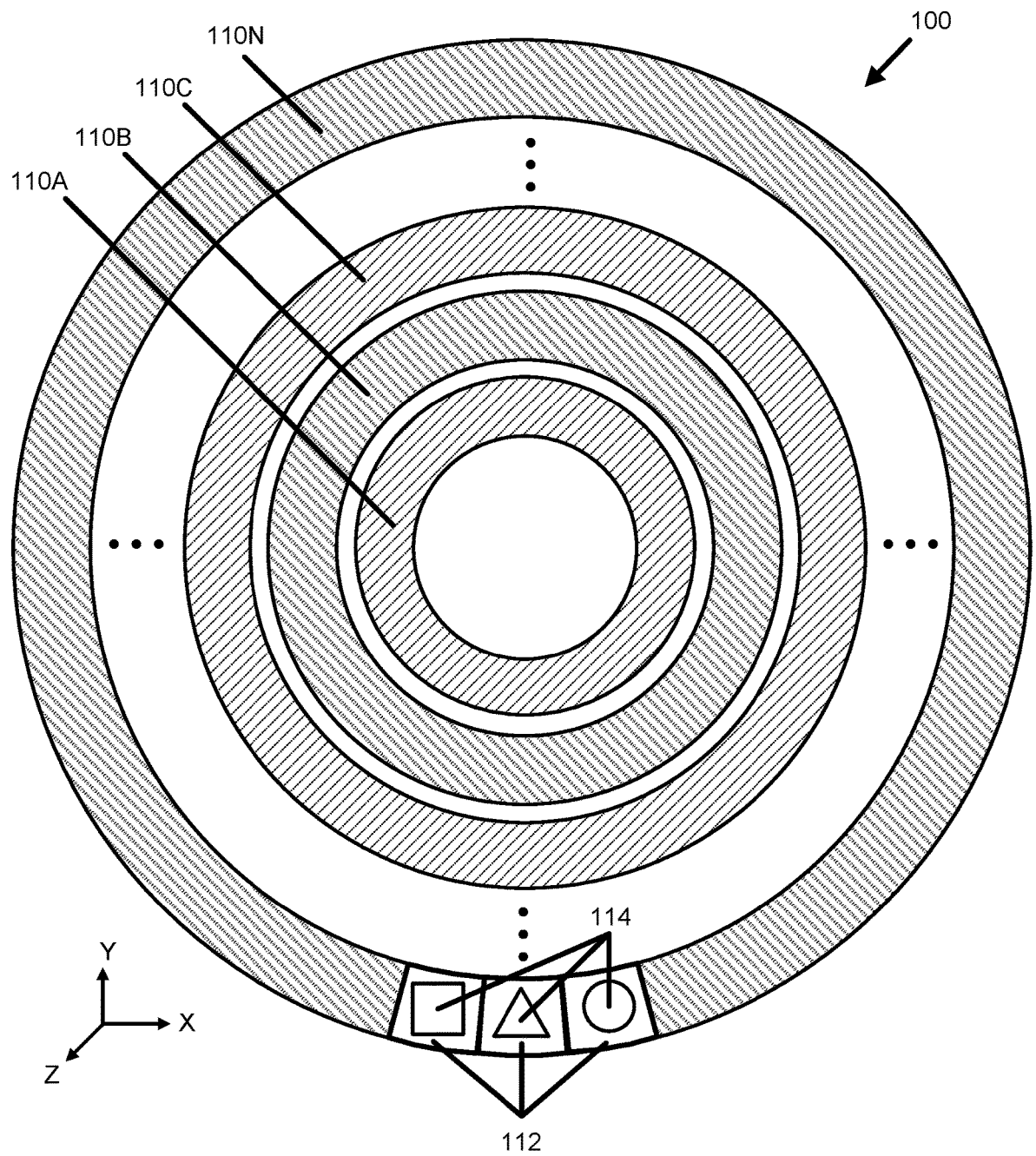
FIGS. 1A-1F are views of exemplary systems of conveyors, in which one or more of the processes described herein, may be implemented, according to embodiments.

In an embodiment, systems and methods are disclosed for providing and using coordinated, potentially bi-directional, conveyors within an automated system. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

The disclosed conveyor technology may be used in macro-scale contexts, such as warehouse or retail fulfillment, micro-scale contexts, such as automated diagnostic instruments, and anywhere between and beyond. In an embodiment especially suited for the fulfillment context, the conveyance system may comprise storage of items on stacked carousels in multiple concourses. Storage carousels may carry and move items that can be identified by their coordinates on the carousel surfaces. Although the carousels store items en masse, they can move individual stored items to specific locations using, for example, simple automatic push mechanisms. Additionally or alternatively, the carousels may carry racks or bins on conveyors to a stower, thereby enabling stowage of items in identified locations on the conveyors. The coordinates of locations on the conveyors can serve as the identifiers of specific items stowed at those locations. This approach is much more natural for automation, since it does not require the stower to walk anywhere, except to a single stowage port. In addition, human pickers are no longer needed. The need for expensive robotic gripper arms is also obviated.

In an embodiment, the conveyors of the carousels may be moved by a simple rack and pinion mechanism, driven by a stepper or servo motor. This provides high system reliability, since stepper and servo motors have simple structures, and are very rugged, powerful, and reliable, with very few failures. Stepper and servo motors can also provide full control of linear motion (e.g., clockwise and counter-clockwise rotation) and speed, to allow a processor to precisely control stopping, starting, and movement of the carousel.

The use of conveyors (e.g., running on tracks) eliminates the extremely elaborate navigation schemata and collision avoidance required by robotic vehicles. In addition, carousels are much safer than robotic vehicles, since humans can work safely right next to the carousels. However, humans are no longer needed for picking items. This means that carousels can be stacked much higher, since they do not need to be accessible to humans, thereby reducing required warehouse square footage by more than 50%. In addition, carousel motors do not have to be on board a moving object, thereby eliminating the need to charge any batteries.

In an embodiment, place-time identification (PTID) is used to identify stored items, the storage and transport conveyers on which these items are stored, and/or other (potentially, all) components of the system, including, for example, processing stations. PTID means that a processing system that controls the conveyance system may register what it has to move, where it is on which conveyor, where to move it, and when to move it. This allows the overseeing control system to track every item moved, every event that takes place, and the workload of every processing station, and store a detailed history of daily operations. This makes it possible to schedule the day's operations at a high level of detail and granularity. It also makes it possible to create a detailed computer model that accurately tracks the physical operation of the system in real time. In addition, data analytics can be applied to the tracked data to enable vast improvements in system efficiency.

Disclosed embodiments may provide full automation of "picking" in storage and fulfillment systems, using moving storage shelves that transport stored items en masse. The items may be identified by coordinates on the moving storage shelves, enabling selected individual stored items to be ejected at appropriate stations by simple push mechanisms. Thus, certain embodiments can completely eliminate the need for human or robotic pickers to pull items from shelves.

1. System Overview 1.1. Overview of Conveyors

For ease of understanding, movement within the system may be described herein in terms of an X, Y, and Z Cartesian coordinate system, as well as in a time dimension and a "what" dimension. With respect to figures providing a top-down view, the Z axis extends orthogonally through the page, whereas the X and Y axes are within the plane of the page and orthogonal to each other. With respect to perspective views, the Z axis extends substantially vertically through the illustrated system, whereas the X and Y axes are within a plane that is orthogonal to the Z axis.

FIG. 1A is a top-down view of an exemplary system of conveyors, according to an embodiment. In the illustrated embodiment, each conveyor 110 in system 100 is circular in plan view. However, one or more, including all, of conveyors 110 may instead be elliptical, linear, square, rectangular, or any other shape in plan view. In embodiments in which circular or elliptical conveyors 110 are used, conveyors 110 may be referred to as "carousels." Each carousel conveyor 110 rotates around the Z axis and, when concentric, rotates around the same point as every other carousel conveyor 110. Regardless of the particular shape or arrangement, the holding surface (e.g., top surface) of each conveyor 110 may be divided into a plurality of segments 112 that are each configured to hold at least one item 114.

The plurality of conveyors 110 are illustrated as concentric to each other in plan view, with conveyor 110A nested within or surrounded by conveyor 110B, which in turn is nested within or surrounded by conveyor 110C, and so on and so forth. In an embodiment, the top surface of each conveyor 110 lies within the same X-Y plane as the top surface of every other conveyor 110. However, other configurations are possible. For example, the top surfaces of two or more, including all, of conveyors 110 may lie within different X-Y planes. In this case, two or more of conveyors 110, whose top surfaces lie in different planes, may overlap in plan view. In one embodiment, all of conveyors 110 may be of the same radius with their top surfaces lying in different X-Y planes that are all orthogonal to the Z axis. In other words, conveyors 110 may be stacked along the Z axis.

Figure 1B:
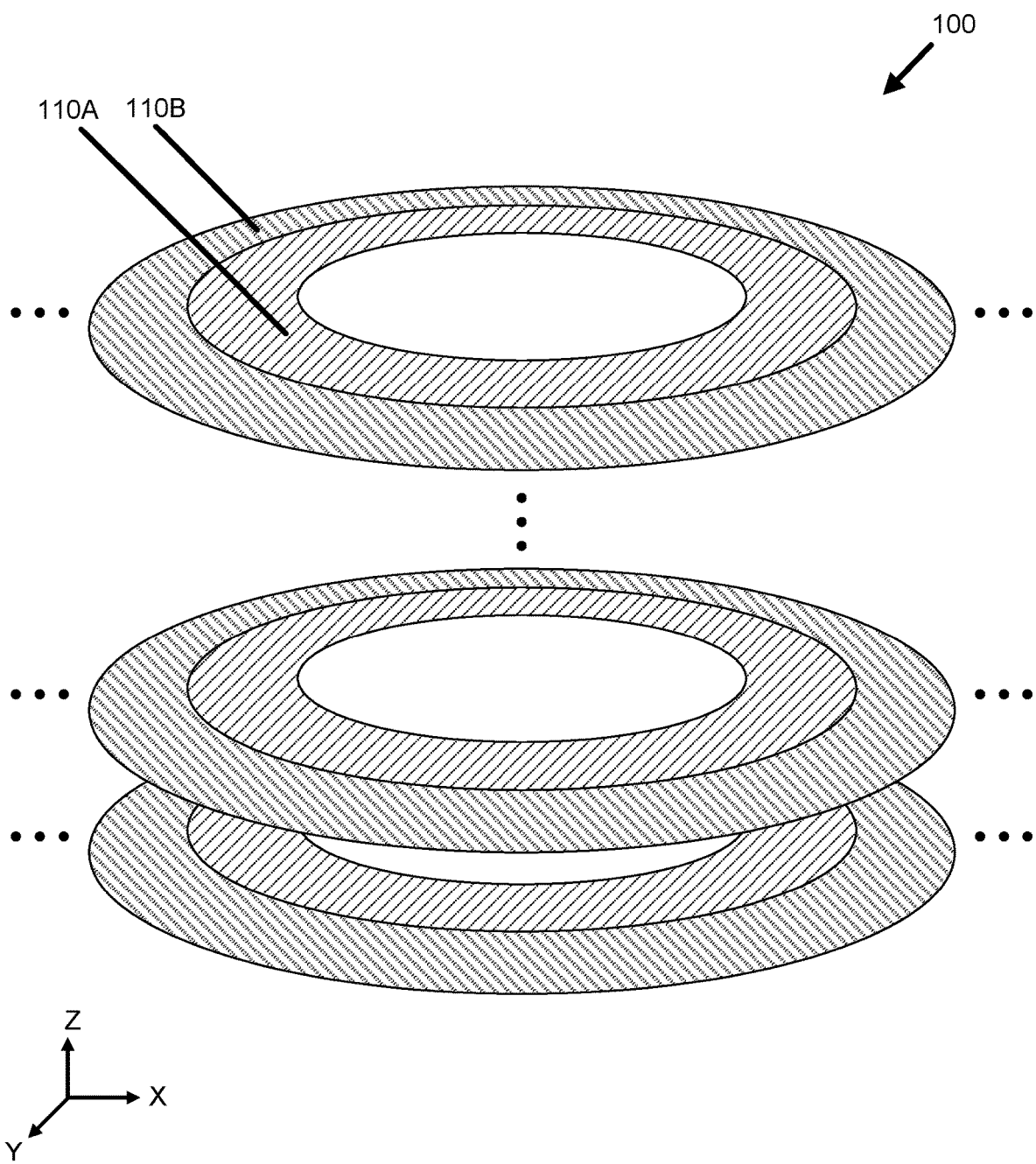

FIG. 1B is a perspective view of an exemplary system of conveyors, according to an embodiment. In the illustrated embodiment, a plurality of nest conveyors 110 are stacked along the Z axis. Conveyance system 100 may comprise any number of stacked conveyors 110, and is generally limited only by the height of the automated system and the spacing required, between stacked conveyors 110, in order to accommodate items 114 on their holding surfaces.

As illustrated, each conveyance system 100 may comprise a plurality of conveyors 110A through 110N. Alternatively, each conveyance system 100 may consist of only a single conveyor 110. The number of conveyors 110 within each conveyance system 100 will generally depend on how conveyors 110 are used within conveyance system 100, desired throughput, and/or other design goals. Thus, the number of conveyors 110 may be one, two, three, four, or any integer N, as illustrated in FIGS. 1A and 1B. In addition, one or more of conveyors 110 may be inclined, may rotate vertically instead of horizontally, may be positioned at an angle, and/or the like. In the illustrated embodiment, conveyors 110 are spaced equidistantly apart from each other. However, in an alternative embodiment, the distances between conveyors 110 may vary within the X-Y plane and/or along the Z axis.

Figure 1C:
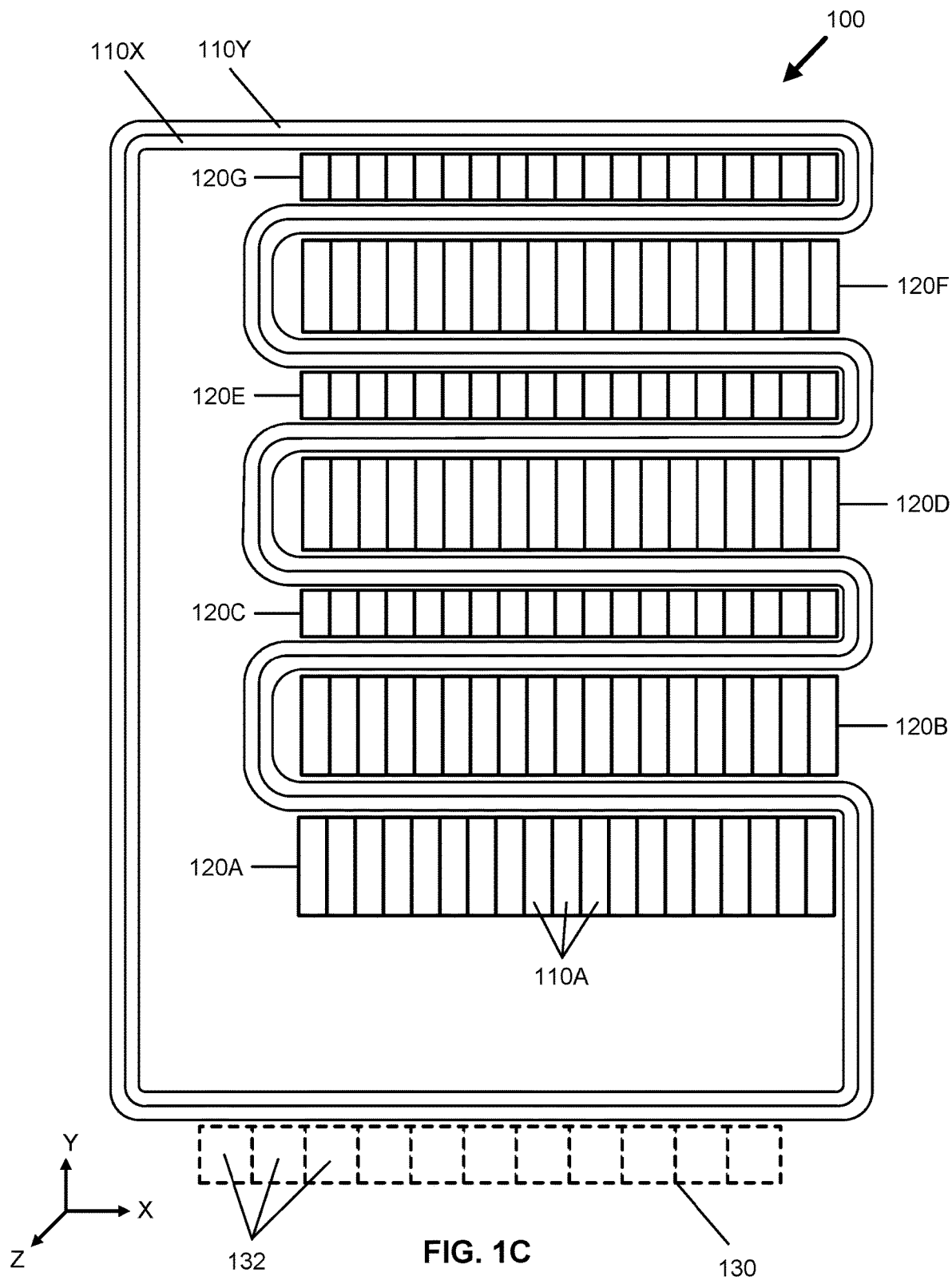

FIG. 1C is a top-down view of an exemplary system of conveyors, according to another embodiment. In the illustrated embodiment, there are two nested conveyors 110X and 110Y that transport items within conveyance system 100. However, in an alternative embodiment, there may be only a single transport conveyor 110 or three or more such transport conveyors 110. In embodiments with a plurality of transport conveyors 110, each transport conveyor 110 may be adjacent and parallel to its adjacent transport conveyor(s) 110. Adjacent transport conveyors 110 may be flush against each other or spaced apart by any distance. Preferably, adjacent transport conveyors 110 are spaced sufficiently close to each other to prevent items 114 from falling or getting stuck between them.

As illustrated, conveyance system 100 may comprise "fingers" which extend between storage systems 120. In this case, each storage system 120 may comprise a plurality of storage conveyors 110A that hold items 114 for storage. For example, each storage conveyor 110A may store a plurality of the same type of item 114, and be configured to load these items 114 onto the segment 112 of a transport conveyor 110 (e.g., 110X or 110Y) in front of that storage conveyor 110A. Conveyance system 100 may comprise any number of storage systems 120. Storage systems 120 in conveyance system 100 may all be the same size or, as illustrated, vary in size (e.g., in terms of the number of storage conveyors 110A, the width and/or length of storage conveyors 110A, etc.).

Each storage conveyor 110 may move in a direction that is orthogonal to the movement direction of the adjacent transport conveyor 110. For example, storage conveyors 110, which may comprise loops in the Y-Z plane, may be configured to move along the Y axis, while an adjacent transport conveyor 110 is configured to move along the X axis. In this manner, storage conveyors 110 may move items 114 towards and onto segments 112 of transport conveyors 110. Specifically, storage conveyor 110A may rotate a segment 112 that is facing up and holding an item 114, until the segment 112 rotates to the end of the storage conveyor's range and downward to a return portion of the loop, thereby causing the item 114 to move off the edge of storage conveyor 110A onto a segment 112 of transport conveyor 110X or into a chute that provides a downward slide path onto a segment 112 of transport conveyor 110X. In an alternative embodiment, storage conveyors 110 in storage systems 120 may be replaced with fixed storage shelves that store items 114 which are pushed onto segments 112 of a transport conveyor 110 (e.g., by a robotic pusher, helical wire, etc.).

Transport conveyors 110 may transport items 114 to a destination system 130. In an embodiment, destination system 130 may comprise pick-up shelves 132 onto which collections of items 114 are stored, or storage areas into which collections of items 114 are stored, for pick-up or further processing. For instance, as the segment 112 of a transport conveyor 110 that is holding a particular item 114 passes a particular shelf 132, a robotic pusher or gripper may move the particular item 114 off of the transport conveyor 110 onto the particular shelf 132. This may be done for a plurality of different items 114, to thereby build a collection of items 114 on the particular shelf 132. In this manner, individual items 114 may be retrieved from a variety of locations on storage conveyors 110 and collected together on a single shelf 132.

In an embodiment, destination system 130 may comprise a plurality of lockers. Each locker may comprise a shelf 132. Each shelf 132 is accessible to transport conveyor(s) 110 from behind and is also accessible from the front (e.g., via an openable, closable, and potentially lockable door). Thus, for example, a customer may select a plurality of consumer products (e.g., via an online store), and the automated system may retrieve the selected consumer products from storage conveyors 110 onto transport conveyor 110 and collect the retrieved consumer products by pushing them from the transport conveyor 110 onto a shelf 132, through the back access opening of the shelf 132, for subsequent pickup and/or purchase by the customer.

Figure 1D:
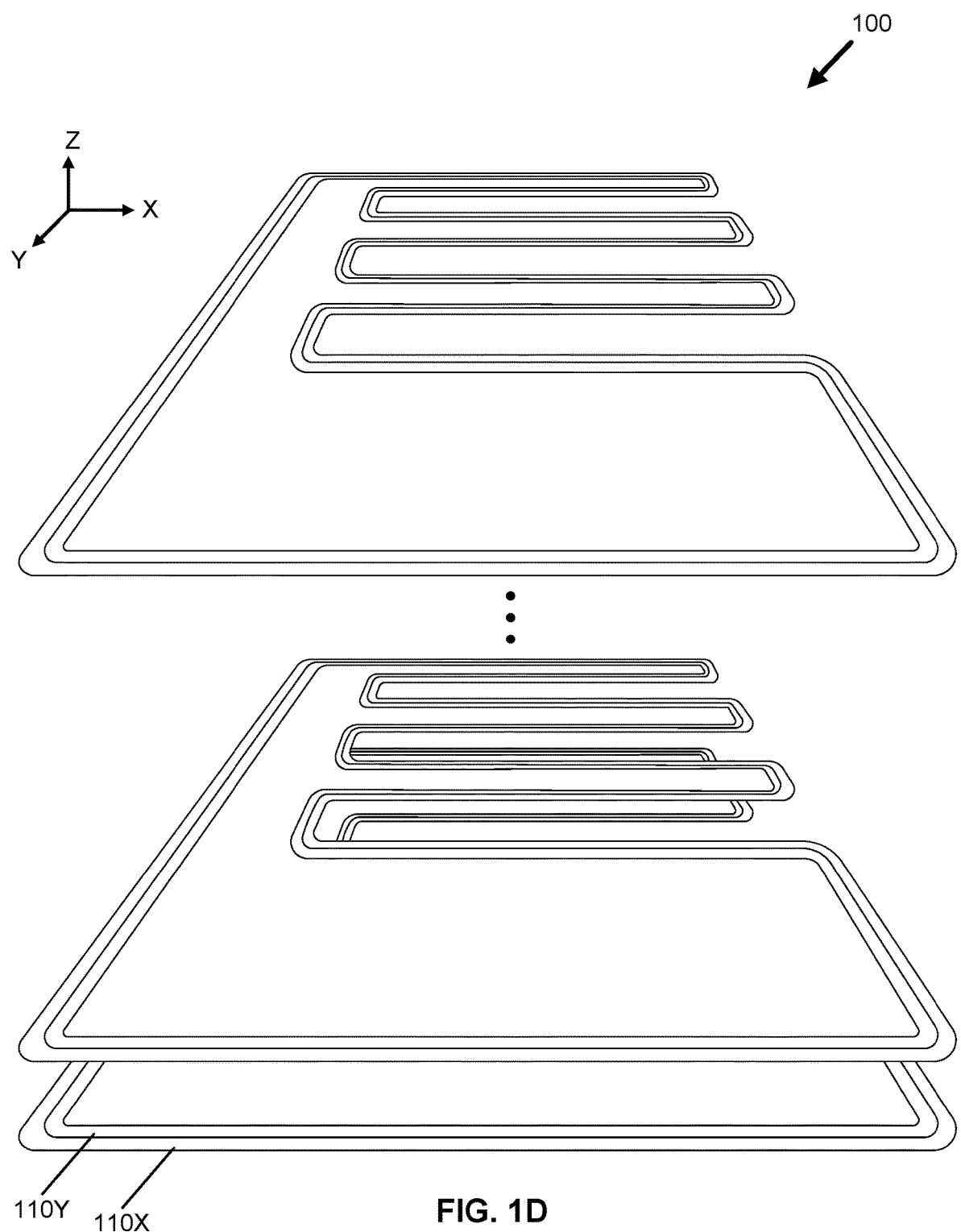

FIG. 1D is a perspective view of the system of conveyors illustrated in FIG. 1C, according to an embodiment. In the illustrated embodiment, a plurality of transport conveyors 110 are stacked along the Z axis. Again, the automated system may comprise any number of stacked transport conveyors 110, and is generally limited only by the height of the automated system and the spacing required, between conveyors 110, in order to accommodate items 114. For ease of illustration, storage systems 120 are not illustrated in FIG. 1D. However, it should be understood that storage systems 120 may also comprise stacked storage conveyors 110A in a similar manner, with each level of storage system 120 corresponding to a level of transport conveyors 110. Alternatively, storage systems 120 may comprise stacked storage conveyors 110A, whereas transport conveyor(s) 110 are all on a single level at the same level as the lowest level of stacked storage conveyors 110A or below the lowest level of stacked storage conveyors 110A. In this case, chutes may provide downward slide paths between each level of stacked storage conveyor 110A and the single level of transport conveyor(s) 110.

Figure 1E:
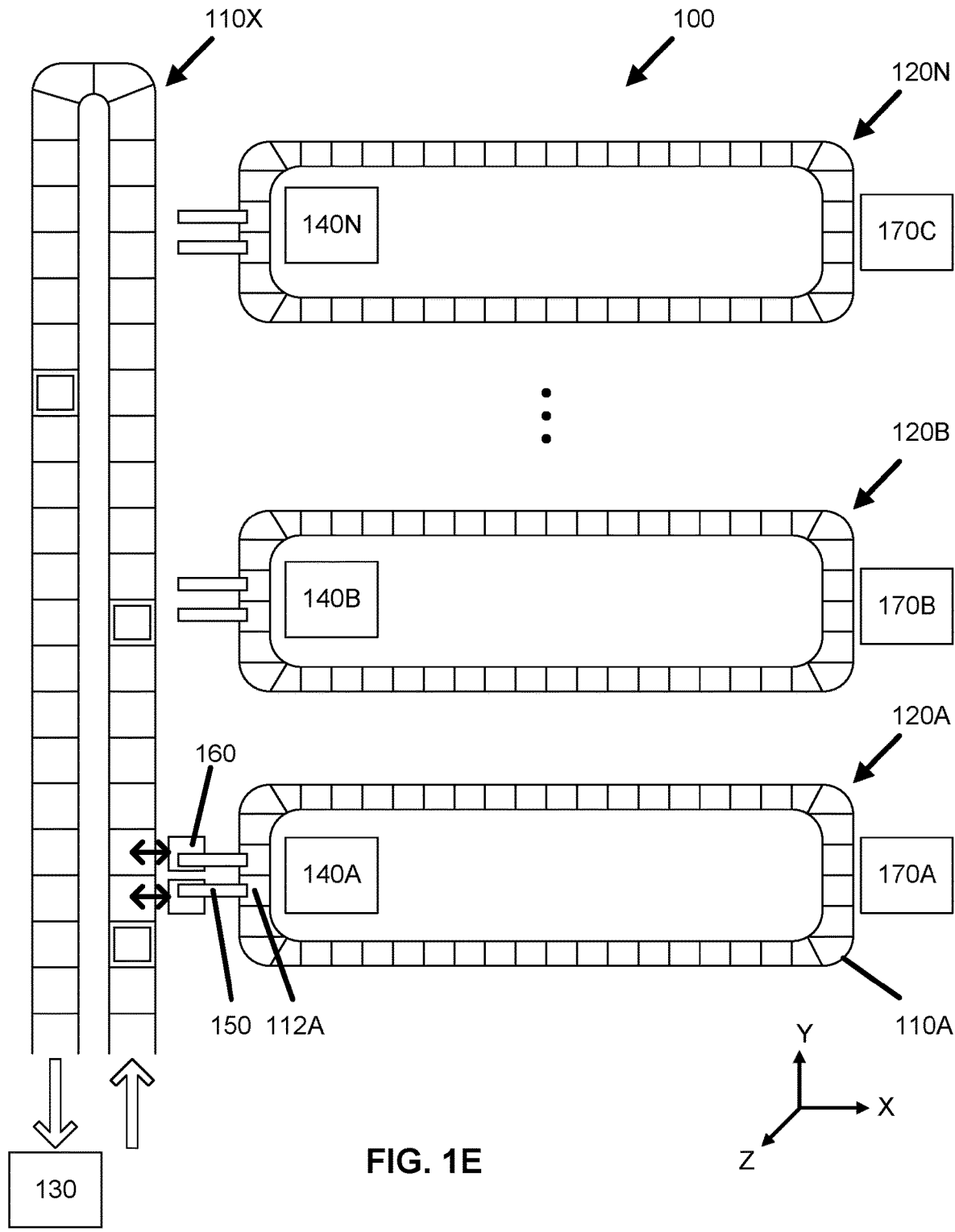

FIG. 1E is a top-down view of an exemplary system of conveyors, according to another embodiment. In this embodiment, conveyance system 100 comprises a transport conveyor 110X and storage systems 120A-120N, each comprising at least one storage conveyor 110A. While only a single storage conveyor 110A is illustrated in each storage system 120, one or more, and potentially all, of storage systems 120 could comprise a plurality of nested storage conveyors 110. Transport conveyor 110X may also comprise a plurality of nested conveyors 110. The system may comprise any number of storage systems 120, including a single storage system 120 or any plurality of storage systems 120. Essentially, storage conveyors 110A may act as moving shelves, to replace stationary shelves in conventional systems.

Figure 1F:
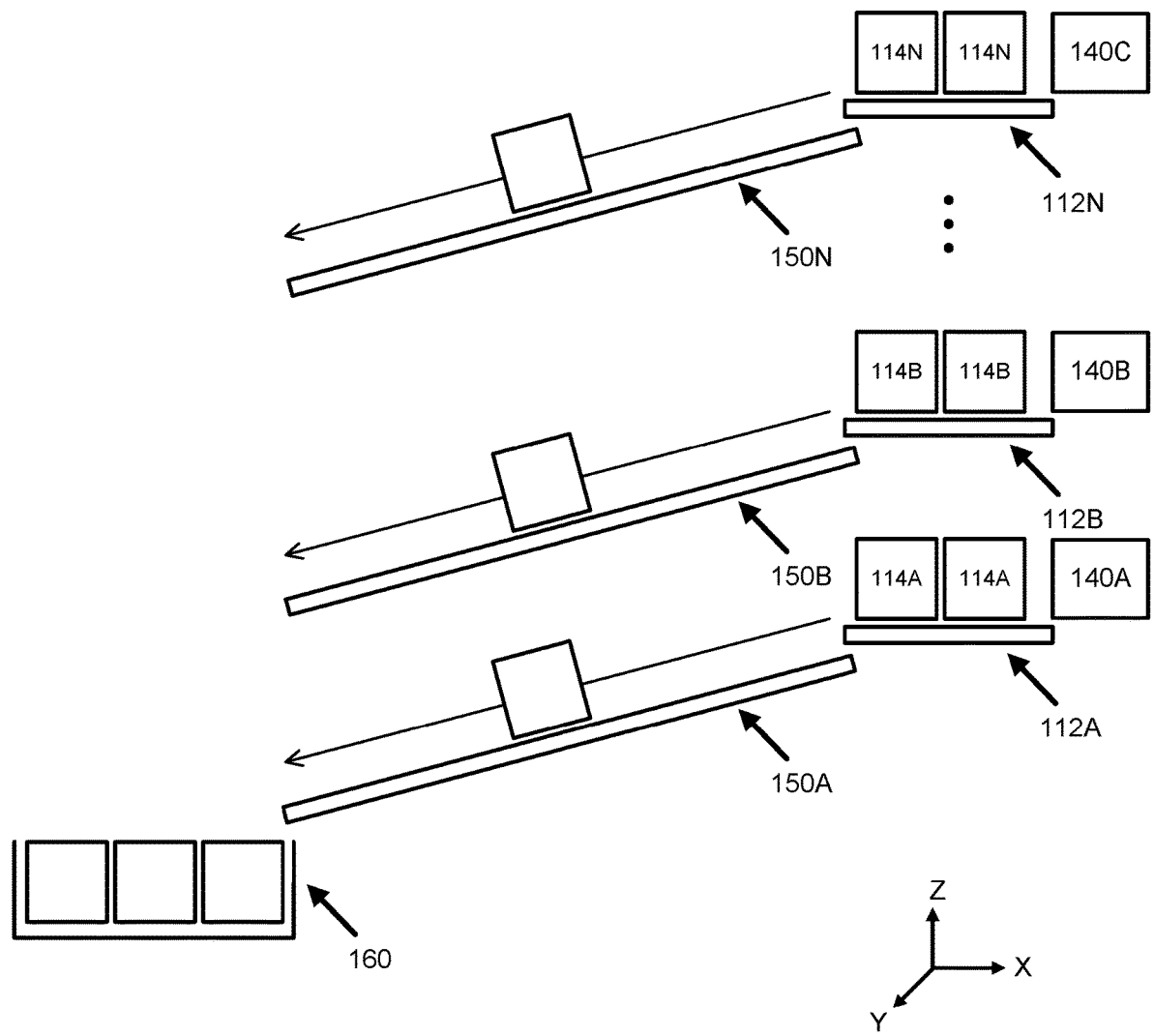

FIG. 1F is a side view of a storage system 120 in the system of conveyors illustrated in FIG. 1E, according to an embodiment. In this embodiment, each storage system 120 may comprise a plurality of stacked storage conveyors 110A. Each storage system 120 may comprise any number of stacked storage conveyors 110A, including a single storage conveyor 110A or any plurality of storage conveyors 110A (e.g., eight stacked storage conveyors 110A, twenty stacked storage conveyors 110A, etc.). For example, in a warehouse, storage systems 120 may be stacked multiple levels high (e.g., thirty levels of storage systems 120). Each stack of storage systems 120 may be referred to herein as a "concourse."

Each storage conveyor 110A may comprise segments 112, which each hold one or more items 114. More generally, each storage conveyor 110 in any of the embodiments may be divided into such segments 112. A segment 112 may hold a single item 114, or may hold a plurality of items 114 (e.g., a rack of items 114). If a segment 112 holds a plurality of items 114, the items 114 may be aligned on the segment 112 in a radial line extending laterally across the storage conveyor 110A (i.e., orthogonally to the direction of movement).

Each storage system 120 may store items 114 on segments 112 of storage conveyor 110A. The items within a single storage system 120 may be related items 114 of the same or similar types (e.g., same SKU), or may be unrelated items 114 of varying types (e.g., different SKUs). Any segment 112 of storage conveyor 110A may be rotated to a station 140, which is configured to unload at least one item 114 from segment 112 into chute 150. For example, station 140 may comprise a robotic pusher, which pushes an item 114 from segment 112, in front of station 140, into chute 150. If a segment 112 holds a plurality of items 114 aligned radially, station 140 may be configured to only unload one item 114 at a time. For example, in an embodiment in which station 140 comprises a robotic pusher, the robotic pusher may be configured to only push a distance which ensures that a single item 114 is pushed into chute 150 at a time. Alternatively, processing system 200 may determine the number of items 114 to be pushed in a single operation, and control the robotic pusher to move a distance sufficient to push only the determined number of items 114 into chute 150 (e.g., using a precise helical-wire push system, such as those used in vending machines).

While two chutes 150 are illustrated per storage system 120 in plan view, each storage system 120 may comprise any number of chutes 150, including a single chute 150 or three or more chutes 150, in plan view. The number of chutes 150 could equal a number of segments 112 on each storage conveyor 110A that are aligned with (e.g., that face) transport conveyor 110X. Each station 140 may comprise a separate robotic pusher for each chute 150 (e.g., two robotic pushers for two chutes 150). In addition, there may be N stacked chutes 150, as shown in the side view in FIG. 1F. Specifically, there may be at least one chute 150 for each level of storage conveyor(s) 110A in the storage system 120. Furthermore, in an embodiment in which transport conveyor 110X comprises a plurality of nested conveyors 110, each level may comprise multiple chutes 150 for a single segment 112 of the storage conveyor 110A to provide a path to each nested conveyor of transport conveyor 110X. As an alternative to multiple chutes 150, a single chute 150 could be movable (e.g., via automated robotics) to change the source and/or destination of a path between segments 112 of storage conveyors 110A, levels of storage systems 120, and/or transport conveyor(s) 110X.

Once an item 114 is pushed into chute 150, the item 114 will travel down chute 150 into a bin 160. For example, each segment 112 of transport conveyor 110X may be configured to hold or comprise a bin 160. When a segment 112 of transport conveyor 110X, holding a bin 160 which is to receive an item 114 from a storage system 120 at a particular chute 150, arrives near the chute 150, the bin 160 may be moved off of the segment 112 of the transport conveyor 110X and placed under the chute 150. Bin 160 may be moved by any known means, including a robotic pusher or puller.

Thus, items 114 in chute 150 slide down chute 150 into bin 160. In this manner, items 114 from multiple storage conveyors 122 may be collected into a single bin 160. For example, items 114 may be collected in a single bin 160 from two or more stacked storage conveyors 110A in the same storage system 120 or two or more storage conveyors 110A from different storage systems 120. Once a bin 160 has been loaded with all of the items to be received at a particular storage system 120 or via a particular chute 150, the bin 160 may be loaded back onto a segment 112 of the transport conveyor 110X. Again, this may be performed by any known means, including a robotic pusher or puller.

In embodiments which utilize concourses of stacked storage systems 120, selected items 114 can be chuted into the same bin 160 from any level of the stack. For example, if each storage system 120 in the stack has two-hundred segments, a concourse comprising a stack of thirty storage systems 120 would provide random access to any one of 6,000 SKUs. In other words, the concourse can store 6,000 different SKUs. This configuration can be scaled, for example, by adding additional concourses. For example, thirty concourses, each thirty levels high, can provide random access to 180,000 different SKUs, and a selected set of items 114 can start being picked within seconds of a customer's order, without the need for any human pickers.

While conveyance system 100 is illustrated and described as pushing items 114 into chutes 150 to transfer the items 114 from storage conveyors 110A to bins 160, other mechanisms for transferring items 114 from storage conveyors 110A to bins 160 may be used that do not utilize a robotic pusher and/or chutes 150. In addition, while bins 160 are illustrated as being removed from transport conveyor 110X while being loaded with items 114, in an alternative embodiment, bins 160 could remain on transport conveyor 110X while being loaded with items 114. This would eliminate the need for any mechanism to move bins 160 on and off transport conveyor 110X.

While stations 140 are primarily described with respect to a mechanism to move items 114 from storage conveyors 110, other types of stations 140 are contemplated. For example, an automated reading station 140 may be positioned near a stowing port to read machine-readable indicia on items 114 that are loaded onto a conveyor 110, as well as throughout conveyance system 100 to record movements using instruments such as cameras.

In an alternative embodiment, the concourses may comprise, instead of conveyors 110, fixed holding shelves to store the items 114. A push mechanism may be located behind each shelf to push items 114 into chutes 150 at the appropriate timing. However, this alternative embodiment would require numerous push mechanisms (e.g., one for each type of item stored in the concourse), and does not achieve the versatility of the primary embodiment in which conveyors 110 are used to store items 114.

Transport conveyor 110X may move groups of items 114, collected from one or more storage systems 120, to a destination system 130. Destination system 130 may be a manual or automated packing and shipping system (e.g., in a warehouse), lockers or checkout registers in a brick-and-mortar store, and/or any other system which may utilize collections of items 114.

Conveyance system 100 may comprise loading areas 170. Loading areas 170 may be automated systems that move items 114 from delivery trucks onto storage conveyors 110A. Alternatively, loading areas 170 may simply allow access to storage conveyors 110A, so that stockers or stowers may manually move items 114 from delivery trucks onto storage conveyors 110A. In this case, loading area 170 may also be referred to herein as a "stowing port." Items 114 may be loaded and automatically inventoried by processing system 200, as discussed elsewhere herein. While loading areas 170 are illustrated on the opposite side of storage systems 120 as chutes 150, loading areas 170 may be positioned on any side of storage systems 120. In addition, although not shown, loading areas 170 may present in any of the embodiments illustrated in FIGS. 1A-1D, as well. It should be understood that loading areas 170 may be positioned to provide direct access to the storage conveyors 110A of a storage system 120 or to provide indirect access to storage systems 120 via transport conveyors 110.

FIGS. 1A-1F illustrate different shape profiles of conveyance system 100. It should be understood that other shape profiles are possible, depending on the intended usage and/or desired layout (e.g., ground footprint) of conveyance system 100. Regardless of the particular shape profile, in a preferred embodiment, each conveyor 110 can move in both directions (e.g., clockwise and counterclockwise in plan view for a carousel conveyor, forward and backward for a linear conveyor, etc.). It should be understood that any of the characteristics described herein with respect to a transport conveyor 110 can also be shared by a storage conveyor 110, and vice versa.

In an embodiment, each conveyor 110 may be driven by its own motor(s), such as a stepper motor, servo motor, Geneva drive, or the like, driving a rack and pinion system, under the control of a processing system described elsewhere herein. In an alternative embodiment, electromagnetic propulsion could be used to drive conveyors 110. Each carousel conveyor 110 may move along a fixed base and be driven (e.g., on a track) by separate or on-board motor(s) or other drive system(s).

In an embodiment, each conveyor 110 may rotate independently from any other conveyor 110, in terms of direction and/or speed, and in parallel. For example, conveyor 110A may rotate in one direction as conveyor 110B rotates in the opposite direction or is stationary. Additionally or alternatively, conveyor 110A may move at a different speed than conveyor 110B. The movement of each conveyor 110 may be independently controlled by one or more processing systems described elsewhere herein. The processing system(s) may be programmed to coordinate movements of conveyors 110 to perform complex logistics in a wide variety of applications.

Each conveyor 110 may be configured to hold items 114 of any size, shape, and type. In some implementations, the same conveyor 110 may be configured to hold items 114 of different sizes, shapes, and/or types. In other implementations, each conveyor 110 holds items of the same size, shape, and/or type.

A conveyor 110 may be configured to move an item at a particular position on the conveyor 110 to a particular location associated with a station 140, destination system 130, or other system. In an embodiment, a conveyor 110 is configured to move an item at a particular position on the conveyor 110 to a location associated with any one of a plurality of stations 140, destination systems 130, or other systems. In either case, a station 140 or other system may comprise one or more instruments for performing some operation (e.g., push, pull, imaging, detection, measurement, manipulation, assembly, grouping, packaging, etc.) on the item. Such a station 140 or other system may perform a single joint operation or simultaneous common operations on aligned items from multiple conveyors 110.

In an embodiment which utilizes multiple stations 140, each station 140 may perform a same or different operation in parallel. For example, a first station 140 (e.g., accessing one segment 112 of conveyor 110) may load one or more items onto conveyance system 100, while a second station 140 (e.g., accessing another segment 112 of conveyor 110) simultaneously unloads one or more items from conveyance system 100. As another example, a first station 140 may load or unload one or more items on conveyors 110, while a second station 140 simultaneously reads machine-readable indicia on items on the same subset or a different subset of conveyors 110.

Items may be positioned on conveyors 110 or housed within conveyors 110 in any manner that is appropriate for the intended use of conveyance system 100. For example, items may rest on a top surface of a conveyor 110. Alternatively, items may be housed within individual drawers, containers, partitions, racks, cubicles, or other housings on a conveyor 110. For example, a conveyor 110 may comprise a series of wheeled cars, linked or articulated together like a train. Regenerative braking could be used to conserve energy in a battery, super capacitor, and/or flywheel, that at least partially powers the conveyor 110.

As discussed throughout, the movements of conveyors 110 may be coordinated under the control of a processing system. However, because conveyors 110 are independently controllable, each conveyor 110 may also be moved on its own in both directions, and independently stopped and started. This enables random access to any portion on any conveyor 110, including any item 114 or set of contiguous items 114 that may be held by that portion. For example, in response to an instruction that identifies an item 114 to be accessed (e.g., issued by another component or system, an operator via a graphical user interface, etc.), the processing system may determine the location of the item 114 on a conveyor 110 (e.g., by mapping an identifier of the item 114 to a PTID discussed elsewhere herein), and move the conveyor 110 so that the location of the item 114 is accessible (e.g., at a particular station 140, destination system 130, indexed position, etc.). As another example, in response to an instruction that identifies a portion (e.g., segment 112) of a conveyor 110 to be accessed (e.g., issued by another component or system, an operator via a graphical user interface, etc.), the processing system may determine the location of the portion of the conveyor 110, and move the conveyor 110 so that the location of the portion is accessible (e.g., at a particular station 140, destination system 130, indexed position, loading area 170, etc.). In this manner, an item 114 can be stowed on or retrieved from conveyor 110, and/or any segment 112 of conveyor 110 can be accessed.

As discussed above, each conveyor 110 may be divided into segments 112. For example, carousel conveyors 110 may be logically segmented into wedges (e.g., annulus sectors, circular arc segments, crescents, etc.). Similarly, linear conveyors 110 may be divided into rectangles. Each conveyor 110 may be configured so that, when the conveyor 110 stops, a center of each segment 112 must be aligned with one of a plurality of indexed positions. In other words, when a conveyor 110 is stationary, the center of every segment 112 must be at an indexed position, and cannot be between indexed positions. Thus, if processing system 200 stops a conveyor 110 before its segment centers are aligned with the indexed positions, conveyor 110 may continue to move the minimum amount necessary for its segment centers to align with the indexed positions prior to stopping. In the case of a carousel conveyor 110, the carousel conveyor 110 would only be able to move by a multiple of a fixed radian amount, and in the case of a linear conveyor 110, the linear conveyor 110 would only be able to move by a multiple of a fixed distance.

The centers of segments 112, as well as the indexed positions, may be equidistantly spaced, and the number of segments 112 may equal the number of indexed positions in a given conveyor 110. In an embodiment, the indexed positions represent a position of the respective conveyor 110 at which at least one of segments 112 is properly accessible by a station 140, destination system 130, or other system. Each conveyor 110, within a set of nested conveyors 110, may have the same number of indexed positions as every other conveyor 110 or a different number of indexed positions than one or more other conveyors 110. Similarly, each conveyor 110 in a set of nested conveyors 110 may be divided into the same number of segments 112 as every other conveyor 110 or a different number of segments 112 than one or more other conveyors 110, depending on the intended usage. In an alternative embodiment, indexed positions may be omitted. In such an embodiment, the processing system may control each conveyor 110 to move to any position and by any rotational or linear distance.

Advantageously, since the automated or robotic movements in conveyance system 100 are short and direct and implemented by the same mechanism (e.g., indexing and movement of conveyors 110), the automated system may utilize a minimalist and inexpensive design. For example, all movements of conveyor 110 may be performed by the same, easily controllable mechanisms (e.g., a drive, which may comprise a stepper or servo motor, Geneva drive, etc., driving a rack and pinion system, electromagnetic propulsion, etc.), and are often direct, one-dimensional, quick, and short. This can remove 90% of the robotic mechanisms employed by current, expensive systems, while increasing throughput rate.

In an embodiment, each segment 112 of a conveyor 110 may be individually movable. For example, each segment 112 may be configured to be shunted out of its respective conveyor 110 (e.g., vertically, horizontally, etc.). When a segment 112 has been shunted out of its respective conveyor 110, other segments 112 of the conveyor 110 may be configured to move into or through the shunted segment's position within conveyor 110, and then the shunted segment 112 may be moved back into conveyor 110. This enables segments 112 to pass each other within conveyor 110.

In addition, in an embodiment, when two segments 112 of two adjacent conveyors 110 are aligned, an item 114 on one segment 112 of one conveyor 110 may be pushed or otherwise transferred to the adjacent segment 112 on the other conveyor 110. This transfer may be implemented by a robotic pusher that is configured to extend across the segment 112 holding the item 114 to push the item 114 across to the adjacent segment 112 and then retract, or a robotic gripper that is configured to grip the item 114 and pull it across to the adjacent segment 112. In such an embodiment, the adjacent conveyors 110 may be substantially flush with each other such that there is no spacing or little spacing (e.g., less than the width of the narrowest item 114 stored in the automated system) between the adjacent conveyors 110, to reduce the chance that an item 114 may become stuck between conveyors 110.

In an embodiment, one or more of conveyors 110 and/or shelves 132 may be temperature-controlled. In such an embodiment, the surface temperature of segments 112 of the conveyor 110 or the entire conveyor 110 or shelves 132 may be controlled using, for example, thermoelectric heating and/or cooling. Different segments 112 of the same conveyor 110 or different shelves 132 may be individually controlled, for example, to be different temperatures than each other. Alternatively or additionally, portions of the encompassing automated system may be temperature-controlled (e.g., ambient cold or hot air in a tunnel). In such an embodiment, processing system 200 may move one or more segments 112 of one or more conveyors 110 into these temperature-controlled portions, to control the temperature of items being held by those segments. In either case, the temperature of the temperature-controlled conveyors 110, shelves 132, or temperature-controlled portions of the automated system may be adjusted under control of the processing system. For example, items which need to be refrigerated or remain frozen may be stored on holding components which are cooled to an appropriate temperature. Similarly, items which need to be heated may be stored on holding components which are heated to an appropriate temperature.

It should be understood that conveyance system 100 may be made compatible with and/or interfaced with any external systems (e.g., via wired and/or wireless communication and an application programming interface (API)). Examples of such external systems including, without limitation, laboratory information systems (LIS), remote operating systems, dashboard systems, quality control systems, alarm systems, inventory management systems (e.g., which manage specimens and/or reagents, and may perform automatic reordering), and/or the like.

1.2. Example Processing Device

Figure 2:
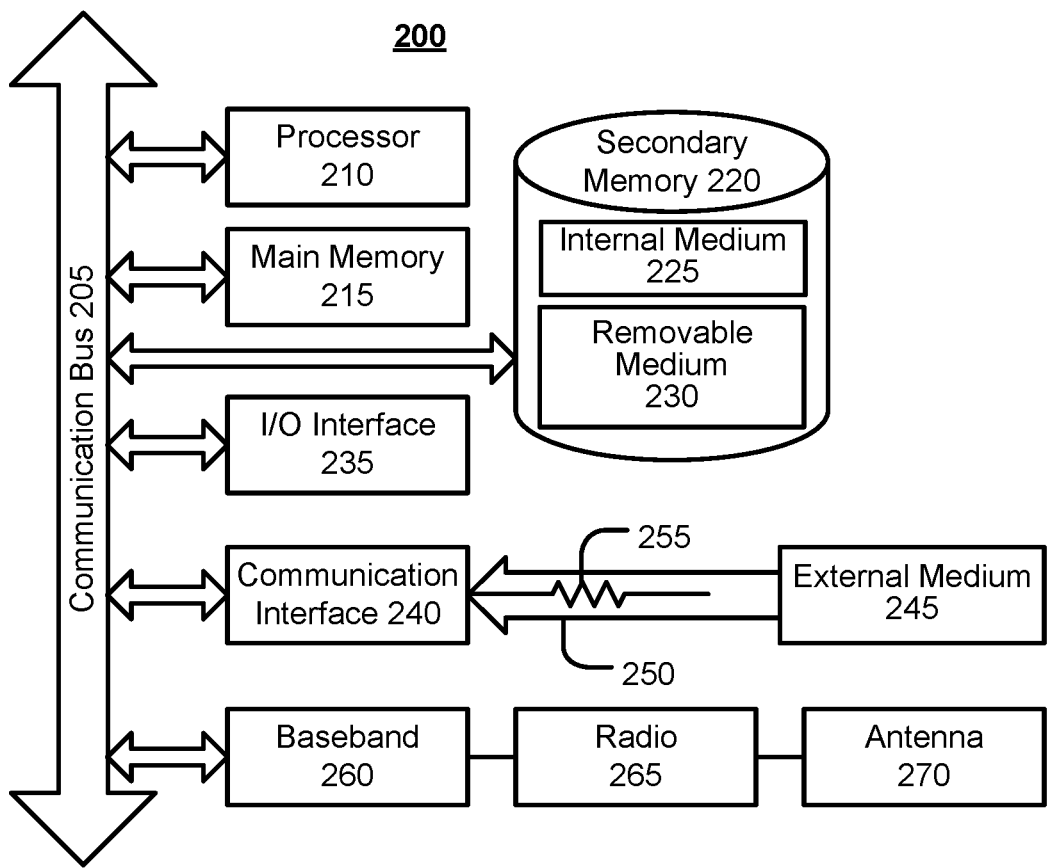
FIG. 2 illustrates an example processing system, by which one or more of the processed described herein, may be executed, according to an embodiment.

FIG. 2 is a block diagram illustrating an example processing system 200 that may be used in connection with various embodiments described herein. For example, processing system 200 may be used as or in conjunction with one or more of the functions, processes, or methods described herein, to control conveyors 110 and/or stations 140 within conveyance system 100, control other robotic systems within the automated system, and/or the like. System 200 can be a server, conventional personal computer, or any other processor-enabled device. Other computer systems and/or architectures may be also used, as will be clear to those skilled in the art.

In an embodiment, system 200 controls one or more motors that drive conveyors 110. For example, system 200 may drive an actuator of a motor to activate and deactivate the motor, change the direction of movement of the motor, change the speed of the motor, and/or the like. An automated system, comprising conveyance system 100, may comprise a separate system 200 for each conveyor 110 and/or a single system 200 that controls two or more, including potentially all, of conveyors 110. In an automated system comprising a plurality of systems 200, the systems 200 may be hierarchically arranged, for example, with one master system 200 managing the operations of two or more slave systems 200.

In addition, system 200 may communicate with one or more stations 140 to control the stations 140 and/or receive, analyze, and/or report data sensed by the stations 140. For example, system 200 may send instructions that control one or more instruments (e.g., camera, NFC chip, radio frequency identification (RFID) interrogator, or other sensor, etc.) of a station 140 to the station 140. System 200 may also receive data (e.g., image data, signal data, etc.) collected by one or more instruments of a station 140. This received data may be analyzed, interpreted, or otherwise processed by system 200 for further control or reporting purposes.

System 200 may also communicate with one or more other systems that are external to the automated system. System 200 may communicate with these external system(s), for example, via an application programming interface (API) and/or over at least one network. System 200 may receive instructions from the external system, and provide data to the external system.

System 200 may manage one or more database tables (e.g., in secondary memory 220) that store information about each item 114 managed by system 200, such that each item 114 can be picked by name, SKU, and/or other properties or characteristics. In addition, system 200 may utilize one or more of these properties to determine how to route and/or prioritize the items 114. For example, based on information about the need of a particular item 114 to be temperature-controlled, system 200 may route the particular item 114 to temperature controlled conveyors 110. In addition, system 200 can use such information to make other determinations, such as the brand or version of item 114 being requested, selection of items 114 closer to becoming outdated or expired for picking, detecting the most popular items 114, detecting out-of-stock or low-inventory items 114 (e.g., to ration those items 114 as much as possible, and/or order more of those items 114) for stowing, selecting substitutions for out-of-stock items 114, and/or the like.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCM-CIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, including one or more software modules) is stored in main memory 215 and/or secondary memory 220. Computer programs can also be received via communication interface 240 and stored in main memory 215 and/or secondary memory 220. Such computer programs, when executed, enable system 200 to perform the various processes and functions described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, comprising one or more software modules, etc.) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various processes and functions of the disclosed embodiments.

1.3. Place-Time Identification (PTID)

As discussed herein, items 114 may be stored on storage conveyors (e.g., as opposed to fixed shelves which require human or robotic stowers and pickers). In an embodiment, each item 114 and/or segment 112 within the automated system is associated with a place-time identifier (PTID). Additionally or alternatively, each conveyor location and/or system component (e.g., station 140) may be associated with a PTID. For simplicity, all of the items 114, locations, or components associated with a PTID may be referred to herein collectively as "entities" or singularly as an "entity."

Each PTID may identify an entity by its location relative to a conveyor 110, its location relative to the ground, the time, what the identified object is, or any combination of these things. Thus, PTIDs can be used to eliminate the need for reading indicia in order to identify an item 114 as it moves through conveyance system 100. In some cases, the PTID may be the sole identifier of items 114 within conveyance system 100.

PTID enables conveyance system 100 to move items 114, stored on conveyors 110, en masse, identified solely by their locations and time. Conveyance system 110 can deliver individual items 114 or groups of items 114 to specific, fixed destinations, in parallel, at a specified time with simple one-dimensional movements that do not require any navigation. This means that a processing system 200, which controls conveyance system 100, knows what item 114 has to move, where that item 114 is on which conveyor 110, as well as where and when to move that item 114.

PTID also enables controlling system 200 to model and identify events. Thus, controlling system 200 may schedule, track, execute, and log all events. Monitored events may be those occurring at stations 140 (e.g., pushing, pulling, pipetting, reading, analyzing, etc.), at a particular segment 112 (e.g., loading, stowing, picking, etc.), and/or anywhere else within conveyance system 100. System 200 may maintain a real-time model of what is occurring in conveyance system 100, to be used for modeling past and future events of conveyance system 100, as well to, for example, identify conveyors 110, stations 140, and/or other components that need servicing.

PTID provides extreme flexibility. For example, in an automated diagnostic instrument, during a batch run of tests, the batch run may be instantly paused and the PTIDs saved, so that an urgent test could be run with a very different arrangement of conveyors. After that urgent test has completed, the processing system can return all of items 114, segments 112, and/or other components to their positions, as represented by their saved PTIDs, at the time that the batch run was paused, and then resume the batch run. Thus, unlike conventional systems which are first-come-first-serve, PTIDs allow flexibility in the order in which operations can be performed by allowing the system to return to a previous state (e.g., by saving and recalling the PTIDs for that state).

In an embodiment, each PTID comprises a vector. In turn, the vector of a PTID may comprise a plurality of sub-vectors. These sub-vectors may include, without limitation, a C-vector, an S-vector, a G-vector, a T-vector, and/or a W-vector. However, it should be understood that the PTID may comprise fewer, more, or different sub-vectors. For example, additional sub-vectors may be added to PTIDs in order to pack additional information into the PTID (e.g., to improve operations).

Each C-vector or component vector may be a one-dimensional vector that indicates on which conveyor 110 or other component (e.g., shelf) an entity (e.g., item 114) is located. For example, the C-vector may comprise a unique identifier of the component.

Each S-vector or surface vector may comprise a set of one or more coordinates, referred to herein as S-coordinates, that identify a fixed position of an item 114 on a surface of one of conveyors 110 or other holding component (e.g., a fixed storage shelf, robotic vehicle, such as a Roomba-type robotic vehicle, etc.) of conveyance system 100. It should be understood that, while the S-vector represents a fixed position on a surface, the surface itself may move, for example, if the surface is a top surface of a storage or transport conveyor 110. In an embodiment, the S-vector comprises Cartesian X and Y coordinates in two-dimensional Euclidean space, about a fixed origin point on the particular surface of the particular component (e.g., top surface of a particular conveyor 110). Each set of X-Y coordinates in the S-vector represents a unique position on the surface.

Each G-vector or ground vector may comprise a set of one or more coordinates, referred to herein as G-coordinates, that identify a position about a fixed origin point on the ground (e.g., the ground surface under conveyance system 100). In an embodiment, the G-vector comprises Cartesian X and Y coordinates in two-dimensional Euclidean space, about the fixed origin point. Each set of X-Y coordinates in the G-vector represents a unique position on the ground. In an embodiment, each G-vector comprises real-world Global Positioning System (GPS) coordinates (e.g., latitude and longitude, and optionally elevation) or similar coordinates defined for a particular space (e.g., housing of the automated system, the floor of a store, factory, or warehouse, etc.).

In an alternative embodiment, the S-vector and/or G-vector may comprise coordinates in a polar coordinate system around a fixed center pole, instead of a Cartesian coordinate system. In this case, the polar coordinates may be referred to as $(r, \theta)$ or radius and angle, instead of $(x, y)$.

Each T-vector or time vector may comprise a time coordinate (e.g., timestamp). Each time coordinate represents a point on a time axis, defining a real time or an elapsed time (e.g., from a fixed, starting point in time, like a stop-watch), and can be used to monitor individual tasks. For example, the T-vector may be used to instruct control system 200 to schedule delivery of an item 114 to a station 140 at a particular time. The T-vector can also be used to perform triage, such as prioritizing tasks (e.g., movements of various items 114), and dealing with the most important (e.g., time-sensitive) tasks first. The T-vector also allows for all events (e.g., movements, processing, etc.) to be scheduled and logged. The T-vector enables a history of past operations in conveyance system 100 to be collected and stored, as well as the projection and scheduling of future operations. The history of past operations may be used for data analytics, for example, to optimize the efficiency of the automated system.

An example of the usefulness of the T-vector in the PTID can be illustrated in the context of a fulfillment warehouse with a plurality of concourses of conveyors 110. Processing system 200 can use the T-vector to precisely schedule events. For example, if items 114 of a shopping list were stored across different concourses, processing system 200 could schedule movement of the items 114 and a bin 160, such that each item 114 in each concourse is at a push mechanism in the concourse at the precise time that the bin 160 passes by the push mechanism. In other words, the position of each item 114 and the position of bin 160 are scheduled so that they coincide with each other at the time that each item 114 is pushed off of its respective concourse. The T-vector enables this level of precision, resulting in improved efficiency.

Each W-vector or "what" vector may be a vector that indicates what the represented entity is. For example, the W-vector may comprise an identifier that identifies the represented entity as an item 114, location, or component of conveyance system 100. The W-vector may further identify the type of item 114, location, or component (e.g., passenger item, stored item, passenger location, storage location, system component, a conveyor 110, fixed surface, a segment 112, a rack, bin 160, etc.). The W-vector indicates what kind of entity the PTID is identifying (e.g., conveyor 110, fixed shelf, item 114, location, segment 112, rack, pipettor, reading, packing, or other station 140, etc.). As such the W-vector is a coordinate in another dimension that represents a type classification. The W-vector allows control system 200 to identify what type of entity is being identified by a particular PTID, for example, so that control system 200 can distinguish between items 114, locations, or system components.

In an embodiment, each conveyor 110 is divided into a plurality of segments 112. Each of these plurality of segments 112 for each conveyor 110 may be permanently associated with a unique pair of C-vector and S-vector that, together, uniquely identify the segment's position within the holding components of the automated system. The holding surface of other holding components (e.g., each represented by a unique C-vector), such as robotic vehicles and storage shelves (e.g., shelves 132), may also be divided into regions or segments that are each associated with its own S-vector.

Each segment (e.g., segment 112 of a conveyor 110 or a segment of another holding component) could also have its own system of S-coordinates. For example, each segment may have its own Euclidean space, defined by X and Y coordinates. Thus, once the S-vector of a segment is specified, the S-coordinates in the S-vectors of all of the PTIDs for all items 114 on that segment can be computed based on the S-coordinate system of the segment. In other words, the segments in Euclidean space may be defined by a set of S-coordinates (e.g., a listing of S-coordinates or a range of S-coordinates). One or more S-coordinates from this set of S-coordinates for a segment can be assigned to individual items 114 on the segment. A large item 114 may be assigned multiple S-coordinates if it takes up an area covering multiple S-coordinates. Alternatively, such an item 114 may be assigned a single S-coordinate that represents the "center of gravity" of such an item 114. Essentially, each segment 112 can be segmented into its own system of segments holding items 114 or portions of items 114.

With respect to a circular carousel conveyor 110, for the purposes of establishing 5-coordinates for the S-vectors, the X axis may be defined as coextensive with the circular profile of conveyor 110, and the Y axis may be defined as a radial line extending outward from the center of the circular profile of conveyor 110. Thus, each item on carousel conveyor 110 may be assigned an X coordinate that identifies the item's location on the circular X axis of carousel conveyor 110, and a Y coordinate that identifies the item's position on a radial line extending through the X coordinate. These S-coordinates are polar coordinates, generally referred to as radius and angle, rather than X and Y. This may be especially convenient in embodiments which utilize nested circular carousel conveyors 110. In a polar coordinate system, each point on a plane is determined by a distance from a reference point and an angle from a reference direction. Thus, each location in the polar coordinate system is a vector, which enables the application of equations in matrix algebra.

A distinct S-vector system may be utilized for each conveyor 100 or other holding component in the automated system. In such an embodiment, two entities could have the same S-vector (i.e., representing that the two entities are in the same location with respected to a fixed point on their respective surfaces), but would have different C-vectors (i.e., because the two entities are on different surfaces). Alternatively, all of the holding components could be defined in a single, shared Euclidean space, especially in the case in which the top surfaces of all of the holding components are within the same plane (e.g., in an embodiment with concentric circular carousel conveyors 110). In such an embodiment, the C-vector may not be necessary, since all 5-coordinates in all of the S-vectors may be defined using a single reference point. In other words, the S-vector alone can be used to uniquely identify an entity's physical location within conveyance system 100.

The Euclidean space of the S-vector system may be superimposed on an underlying ground Euclidean space of the G-vector system (e.g., underlying conveyors 110 and other holding components of the automated system). Both Euclidean spaces may have the exact same dimensions, and the Euclidean space of the S-vector system may directly relate to the ground Euclidean space of the G-vector system about a fixed origin point on the ground Euclidean space beneath conveyors 110. The choice for the origin point will depend on the implementation and application of the automated system, and there may be multiple origin points. When a conveyor 110 is stopped while the origin points are aligned between the two systems, or the holding component is a fixed component (e.g., holding shelf), the S-vector may match precisely with the S-vector. As discussed above, S-coordinates of items 114 on moving surfaces, such as the top surfaces of conveyors 110, may move over time relative to the G-coordinates of those items 114. However, because of the relationship between the S-vector system and the G-vector system, points in the S-vector system may be tied to fixed points in the G-vector system. In addition, positions of items 114 and/or conveyors 110 may be constantly monitored (e.g., as they pass reading stations 140).

In the manner described above, an item 114 can be associated with a PTID, so that its exact location throughout the automated system can be tracked by processing system 200. In other words, the exact location of an item 114 within an automated system can be identified using its assigned PTID. Processing system 200 tracks the PTIDs of all items 114 within the automated system at all times, and may control their movements without human intervention. For instance, processing system 200 may control conveyors 110 and/or other devices (e.g., a robotic pusher or gripper, an automated packer, etc.) to fetch an item 114 or set of items 114 from a source PTID (e.g., a storage conveyor 110 or shelf), move it onto a transport conveyor 110, convey the item(s) 114 on the transport conveyor 110 (during which time the PTID may be continually updated to reflect its changing G-vector, while its S-vector remains fixed), and deliver the item(s) 114 on the transport conveyor 110 to a destination PTID (e.g., a shelf 132). The movement of items between holding components (e.g., conveyors 110, shelves 132, etc.) may be observed by cameras, which may be monitored and/or controlled by artificial intelligence (AI).

In an embodiment, processing system 200 can be configured (e.g., by software) to move an item 114 to a specific position within conveyance system 100 (e.g., a segment 112, a packing or other processing station 140, chute 150, loading area 170, etc.) at a specific time based on a combination of C-vector, S-vector, G-vector, and T-vector. Fixed destinations (e.g., a stationary station 140) may be assigned a W-vector and fixed G-vector in the underlying Euclidean ground space.

In an embodiment, processing system 200 may utilize an optical or mechanical system (e.g., optical reading stations 140 that optically scan codes on items 114 and/or segments 112 as they pass) to continually determine the G-vector for a given S-vector based on the relationship of the fixed origin point of the G-vector and S-vector systems. In other words, processing system 200 can determine the exact position of a conveyor 110—and therefore, items 114 on the conveyor 110—at any given moment. Accordingly, processing system 200 may calculate the G-coordinate of any item 114 on a conveyor 110, regardless of whether conveyor 110 is stopped or in motion. This enables processing system 200 to control the G-coordinate of any item 114, for example, by moving the item 114 from one G-coordinate to another G-coordinate using one or more conveyors 110. This can be important for quality control in the PTID system.

Relational databases may be used to track items 114 via their PTIDs. Specifically, each item 114 may be associated in a relational database with a PTID. The PTID may be used as an index or key into the relational database of items 114. For example, an S-vector may be used as an index into a table of items 114, to retrieve all or a subset of information about one or more items 114 having that S-vector. Alternatively or additionally, a combination of a G-vector and T-vector may be used as an index into the table of items 114. Alternatively or additionally, any other sub-vectors or combination of sub-vectors or any indicium reading (e.g., captured by a reading station 140) may be used as an index into the table of items 114. The items 114 may be associated, in the relational database, with other data as well, such as an item identifier (e.g., SKU), one or more item descriptors (e.g., type, price, etc.), and/or the like. A relational database may persistently record every movement of an item 114. For example, a row may be stored in a movement table that identifies the item 114 that was moved, the PTID of the source of the movement, the PTID of the destination of the movement, the time of the movement, and/or the like. This history of movements can be used for a variety of applications, including auditing, debugging, calculating royalties for use of conveyance system 100, and/or the like.

As mentioned elsewhere herein, in an embodiment, conveyance system 100 enables random access of any item 114 or set of contiguous items 114 stored on any conveyor 110 and/or to any segment 112 of any conveyor 110. For example, each segment 112 may be individually addressed by a PTID. Processing system 200 may receive an instruction for random access to an item 114 or segment 112. The instruction may comprise an identifier of the item 114 and/or the S-vector or full PTID of the segment 112, and may be received from another component of the automated system, from an external system, from an operator via a graphical user interface of the automated system, and/or the like. If the instruction comprises an identifier of the item 114, processing system 200 may map the identifier to an S-vector or full PTID that identifies the segment 112 and conveyor 110 on which the item 114 is located. Otherwise, if the instruction comprises the S-vector or full PTID, this S-vector or PTID readily identifies the segment 112 and conveyor 110 to be randomly accessed to processing system 200. In either case, once the segment 112 has been identified, processing system 200 may then control the conveyor 110, comprising the segment 112, to move the segment 112 into a position in which it may be accessed. For example, the access position may be a position that is accessible to a station 140 (e.g., comprising a robotic system, such as a pusher or gripper), destination system 130, loading area 170 (e.g., for stowing or picking), and/or the like.

In this manner, any segment 112 and/or item 114 within conveyance system 100 can be randomly accessed. This ability to randomly access segments allows an item 114 to be quickly unloaded from or loaded onto any segment 112 of any conveyor 110, and enables high-volume items 114 (e.g., frequently used or purchased items) to be stowed on conveyors 110 near each other and/or near an access position. In addition, processing system 200 may utilize random access of segments 112 of conveyors 110 to automatically re-sort items 114 on conveyors 110, for example, to optimize placement of those items 114 within the automated system (e.g., to stow more frequently used or purchased items closer to a destination system 130, station 140, loading area 170, etc.).

As long as an item 114 is positioned on a particular holding component (e.g., a particular segment 112 of conveyor 110, robotic vehicle, or storage shelf), there is no need to continue tracking the item 114 via reading methods (e.g., barcode readers), since the location of the item 114 may be fixed at its associated S-vector for the duration of its processing or moved to another known S-vector. Thus, advantageously, since items 114 are processed in place, once an item's position has been identified once (e.g., by reading its associated barcode or other machine-readable indicia at a particular S-vector), it does not need to be identified again. This is true even after multiple transfers of items 114 to other conveyors 110 (e.g., during a sorting process), since the S-vector on the next conveyor 110 is captured at each transfer (i.e., PTID preservation). The preferred operating principle is to establish PTID identification of passenger items 114 as early in the process as possible, and just once.

In an embodiment, when an item 114 or rack of items 114 is transferred from one conveyor 110 to another conveyor 110, the PTID for each transferred item 114 or rack is updated to reflect the transfer. By establishing new PTIDs of an item 114 on the new conveyor 110, an item 114 can proceed through the supply chain, identified solely by its current PTID. This obviates the need to scan item 114 again and again throughout the supply chain. For example, since the location of an item 114 (e.g., a combination of its current C-vector and S-vector) is already known before a transfer, and the location of its destination (e.g., a combination of a C-vector and S-vector of a segment 112 on which the item 114 is to be pushed or pulled or otherwise transferred) is known, processing system 200 can simply update the PTID of the item 114 (e.g., to reflect the combination of C-vector and S-vector of the segment 112 on which the item 114 is transferred), without having to scan the item 114 (e.g., to determine its current location).

There are many complicated and expensive mechanisms available for identifying items as they move, such as a reader that scans items as they are pushed off a fast-moving conveyor. However, all of these mechanisms require a fixed scanner at each transfer or exit point. Advantageously, the use of PTID eliminates the need for such scanners.

In addition, since conveyors 110 can be brought to a stop, simpler pick and/or push mechanisms can be used for transfers, with a concomitant reduction in expense. For example, in an embodiment, for a transfer of an item between two conveyors 110, the two conveyors 110 may be stopped such that the source segment 112 (i.e., the segment 112 on which the item 114 is currently being held) and the destination segment 112 (i.e., the segment 112 onto which the item 114 is to be transferred) are adjacent to each other. Then, a very simple push mechanism may be used to push the item 114 from the source segment 112 onto the destination segment 112. This eliminates the need for complicated and expensive gripper mechanisms, and reduces the opportunities for errors to occur during the operation. In this case, processing system 200 simply updates the C-vector and the S-vector in the PTID of the transferred item, 114 from the C-vector and S-vector of the source segment 112, to the C-vector and S-vector of the destination segment 112, respectively. This can all be done without having to scan the item 114.

Advantageously, this ability to use simple, inexpensive mechanisms, to transfer items 114 within conveyance system 100, makes an automated stowing system practical for the first time. As an example, a clinical lab could receive samples at a window. The samples are scanned, thereby informing the automated system of their arrival and existence. In addition, the tests to be performed on the samples may be entered into the automated system (e.g., manually or via an LIS). To save multiple manual stowing steps, the samples can be placed into a rack (e.g., with 20×20 slots for samples) upon reception. The PTID of the rack as a whole may be automatically established at that time. The newly established PTID may be validated by an overhead camera system (e.g., functioning as a reader station 140). In addition, the PTID of each sample in the rack may be automatically established, at that time, according to an S-coordinate system of the rack (e.g., 20×20 coordinate system). In other words, each sample gets a PTID with an S-vector representing its position within rack-specific S-coordinate system (e.g., one of the rack slots in a 20×20 grid). Thus, a large number of samples (e.g., up to 400 in a 20×20 rack) can be loaded, and the PTIDs for all of the samples quickly computed, in a single step. The conveyor system 100, into which the rack of samples is loaded, can then stow the rack in an optimal location on a conveyor 110 within the automated system, thereby eliminating the need for stower walks. In this manner, samples can be loaded into the automated system en masse, as opposed to small unidentified lots having to be identified on board. The samples can also be scheduled for delivery serially to various stations 140 within the automated system for their respective tests.

The PTID system can be extended throughout the entire supply chain, to provide instant, integrated feedback, which facilitates just-in-time and Kaizen systems. For example, PTID enables an automated system to schedule all movements and operations within a time period (e.g., a workday). As soon as a test is ordered on the LIS (e.g., by a physician), the automated system may use the PTID for the sample to be tested to make reservations for the sample at accession and at each test station 140. All movements and operations within the automated system may be modeled and scheduled (e.g., based on a stored history of movements and/or operations), to improve quality control, throughput, efficiency, load levels, invoicing, advanced data analytics, and/or the like. Thus, for example, if one test station 140 will be busy during a particular time period, the automated system can schedule testing to prevent back-ups at that test station 140 and/or perform other tasks in parallel, to thereby improve throughput.

In the context of a warehouse, carousels can be arranged hierarchically and managed using the PTID system. For example, at one level of the hierarchy, slower carousel conveyors 110 store bulk amounts of inventory. At another level of the hierarchy, faster carousel conveyors 110 store smaller amounts of the inventory for quicker access. As items 114 in the faster carousel conveyors 110 become depleted (e.g., as determined by that item's SKU being associated with fewer PTIDs in the faster carousel conveyors 110), items 114 from the slower carousel conveyors 110 may be transferred to the faster carousel conveyors 110. These items 114 may be transferred according to a schedule that ensures the faster carousel conveyors 110 are re-stocked before depletion but at a time which does not interfere with operations (e.g., when there are fewer operations or tasks to perform, such as during an expected non-busy hour). Thus, throughput in packing and shipping processes can be significantly improved. In addition, processing system 200 can determine when the warehouse is running out of a particular item 114, and automatically pass a request up the supply chain to initiate and/or schedule a re-supply of the item 114 to the warehouse. Thus, processing system 200 can perform inventory and shipping control, as well as event scheduling.

A pairing of a T-vector with either an S-vector or G-vector can be thought of as a metonymous name or key that labels and identifies passenger items 114 and system components (e.g., pipettors, automated packers, etc.), and which processing system 200 can use to specify and control operations within the automated system. A pairing of a G-vector with a W-vector could name a passenger item 114, station 140 (e.g., pipettor, packer, etc.), bin 160, and/or any other component. Advantageously, PTID allows processing system 200 to identify many disparate types of entities by vector values. For example, processing system 200 can execute AI algorithms that use this PTID-based knowledge of items 114 and stations 140 to self-optimize the automated system.

As discussed elsewhere herein, processing system 200 may track and update each S-vector in the PTID of any moving item 114 or component, relative to the G-vector system, by monitoring positions of conveyor 110. During this tracking, processing system 200 may also dynamically update the T-vector of the PTID for the moving item 114 or component. Thus, processing system 200 can track any moving entity, both as to its current location and its future location at any particular moment in time. In addition, processing system 200 may store a history of all movements, operations, and/or other events within conveyance system 100 (e.g., in secondary memory 220). It should be understood that this history may comprise all events up to the current time. In addition, processing system 200 can store all scheduled events for the future (e.g., in secondary memory 220). Thus, processing system 200 can use this constantly updated information to identify what is at a certain G-vector (i.e., ground location) at any T-vector (i.e., time), without having to employ an S-vector.

The PTID system also enables processing system 200 to schedule labeled events. For example, processing system 200 could schedule a C-vector and S-vector (i.e., a particular position on a surface of a particular conveyor 110) at a particular G-vector and W-vector (i.e., a particular thing at a particular ground position within the automated system) at a particular T-vector (i.e., at a particular time). In this manner, processing system 200 could schedule this particular PTID to line up a particular item 114 or segment 112 in front of a particular station 140 (e.g., pipettor, packer, etc.). In addition, a combination of a C-vector, G-vector, and T-vector can model an event (e.g., processing a given sample at a given test station 140).

The PTIDs may also be used by processing system 200 for triage. For example, assume there are a lot of orders for tests at a hemostasis station 140 of an automated diagnostic instrument. The ability of processing system 200 to make reservations at the station 140 would be worthwhile, since it would be important to ensure that no hemostasis time slots are wasted and that there are no delays in getting a sample to the hemostasis station 140 for its reserved time slot. Processing system 200 can use one or more algorithms (e.g., machine-learning or other AI algorithms) to utilize the PTID vectors and optimize scheduling. For example, the algorithm(s) may optimize reservations, optimize queuing of items 114 (e.g., near the hemostasis station 140), ensure that conveyors 110 are free to transport items 114 to the hemostasis station 140 in time for their reservations, and/or the like. As soon as tests are ordered by a physician or when a sample is accessioned at the automated system, all tests ordered for the sample may be scheduled into specific time slots (i.e., T-vectors) at each test station 140 (e.g., pair of G-vector and W-vector). In addition, urgent test orders may be given priority and triage, such that other tests of other samples may be delayed and/or rescheduled if necessary, to enable urgent test orders to be conducted before lower-priority orders.

In an embodiment, processing system 200 performs quality control on the PTID system. For example, automated reading stations 140 may be positioned selectively throughout conveyance system 100 to read machine-readable indicia on items 114, passing by on conveyors 110, to confirm that the identity being provided by the PTID is correct. Specifically, the machine-readable indicia may be used to retrieve an item 114 and its PTID, and the retrieved PTID may be compared to the PTID that corresponds to the position in front of the automated reading station 140 that captured the machine-readable indicia, according to the tracking by processing system 200. If the PTIDs match, then the PTID system is aligned with reality. Otherwise, if the PTIDs do not match, then the PTID system is misaligned, and a recalibration process may be initiated, an immediate alarm (e.g., indicating a malfunction) may be raised (e.g., sounded or sent to one or more recipients), and/or the like. Instances of PTID verification can be done as a statistical sampling, to ensure that the PTID system is properly aligned, thereby providing continuous confidence in the integrity of the PTID system. In a further safeguard, machine-readable indicia (e.g., QR codes) may be printed on the surface of conveyors 110 (e.g., on one or more or all segments 112), to thereby label locations to be sampled by an automated reader station 140 for PTID verification on a statistical basis.

In an embodiment, processing system 200 monitors and records the current position of every conveyor 110. For example, in an embodiment which uses stepper motors to move conveyors 110, processing system 200 may count the pulses sent to the stepper motors of conveyors 110 to track their current positions. Alternatively, processing system 200 may read machine-readable indicia on conveyors 110 as they pass automated reading stations 140, as described above. In either case, if there is a misalignment or malfunction of the PTID system, processing system 200 can use this information to bring the PTID system back into alignment with conveyance system 100.

In addition, all stowing events may be monitored (e.g., by a camera system) to further ensure PTID integrity. For example, every time that a conveyor 110 brings up a storage segment 112 for stowing, a camera may capture an image or video of the item 114 that is placed on the storage segment 112. In an embodiment, once an item 114 is placed on a particular location on a surface of conveyor 110, that item 114 is never moved to any other location on the same surface of the same conveyor 110, such that its S-vector while on that conveyor 110 is constant.

In an embodiment, one or more of conveyors 110 (e.g., potentially all conveyors 110) in conveyance system 100 may be magnetic conveyors. Magnetic conveyors use magnets to releasably fix ferrous items to the conveyor belt. This can be used to ensure that items 114 on the surface of the conveyor belt remain at a precise S-vector, even during movement of the conveyor belt. Notably, the items 114 themselves do not need to be ferrous (but could be in a particular application). For example, the items 114 may be arranged in ferrous racks or other containers, as discussed elsewhere herein. In this case, processing system 200 may calculate individual PTIDs for the items 114, based on the PTID of the rack or other container in which they are arranged.

Since processing system 200 is able to log the operations of every fixed or moving entity by its PTID, the PTID system enables unprecedented control over the efficiency of operations of a logistics system, whether micro or macro in scale. For example, PTIDs make it possible to automate many of the functions of a fulfillment center "water spider," which refers to a human worker, whose job is to detect and timely remedy any blockages to smooth operations. Since PTIDs enable processing system 200 to continuously model all operations of all entities, fixed or moving, when any entity is malfunctioning, slowing down, overloaded, or out-of-stock, processing system 200 may divert operations to a redundant entity or call for timely human remediation with a specific recommendation.

Advantageously, at least partially as a result of the use of PTID to identify every SKU or item 114 within conveyance system 100, human pickers can be eliminated (e.g., in the context of a fulfillment warehouse). This is because the granular location (e.g., on a particular surface of a particular component) of each item 114 is known to processing system 200, from the time it enters the automated system, throughout its entire stay within and journey through the automated system, until it exits the automated system (e.g., until it leaves a transport conveyor 110 at a shipping or packaging area). Conventional systems generally do not maintain such granular and consistent information, and therefore, need a human to identify and pick specific items for collection. The disclosed conveyance system 100 is the only system, of which the inventor is aware, that enables the elimination of human pickers for the collection of items.

1.4. Example Coordination of Carousels

Figure 3A:
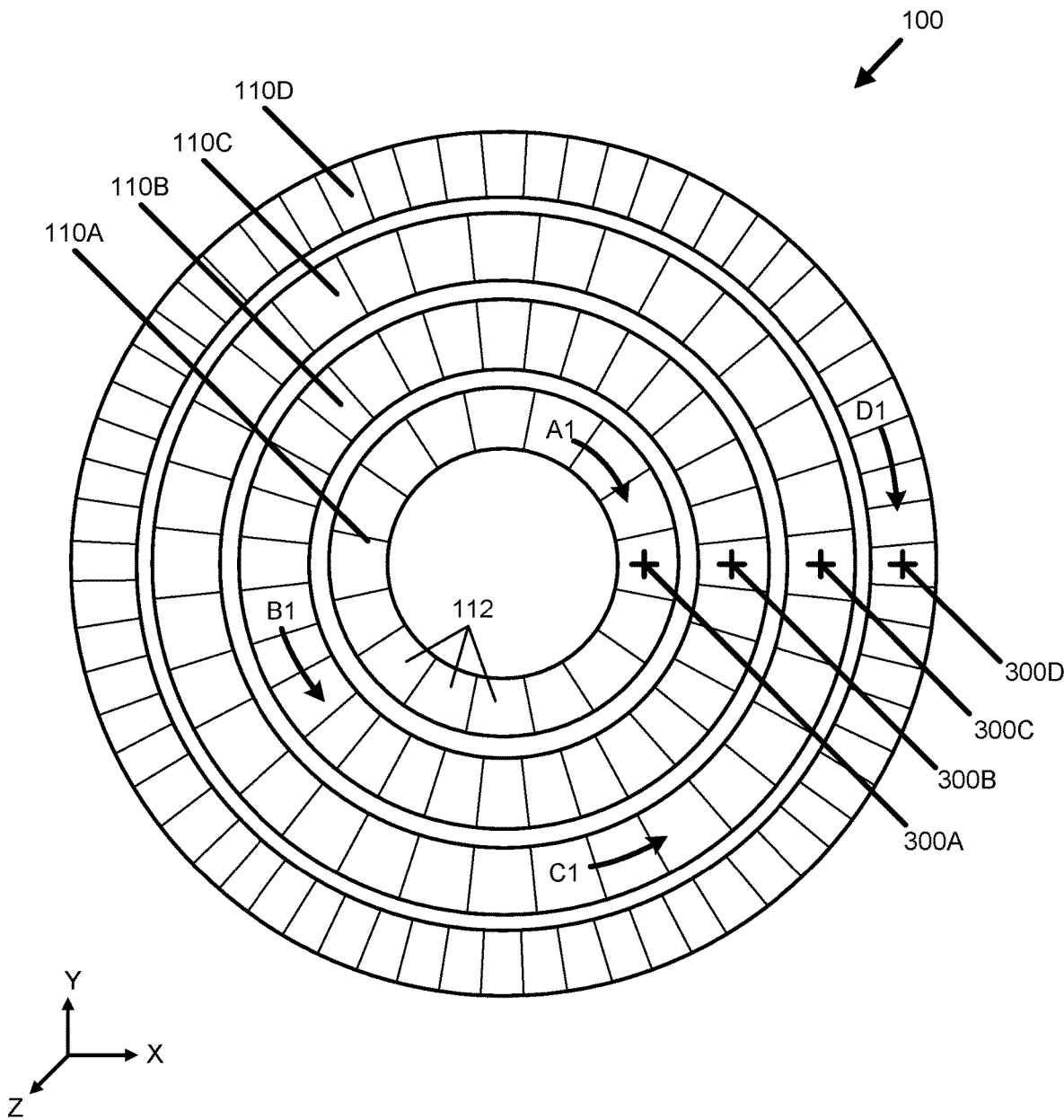
FIGS. 3A and 3B illustrate an example of how the movements of conveyors may be coordinated, according to an embodiment.
Figure 3B:
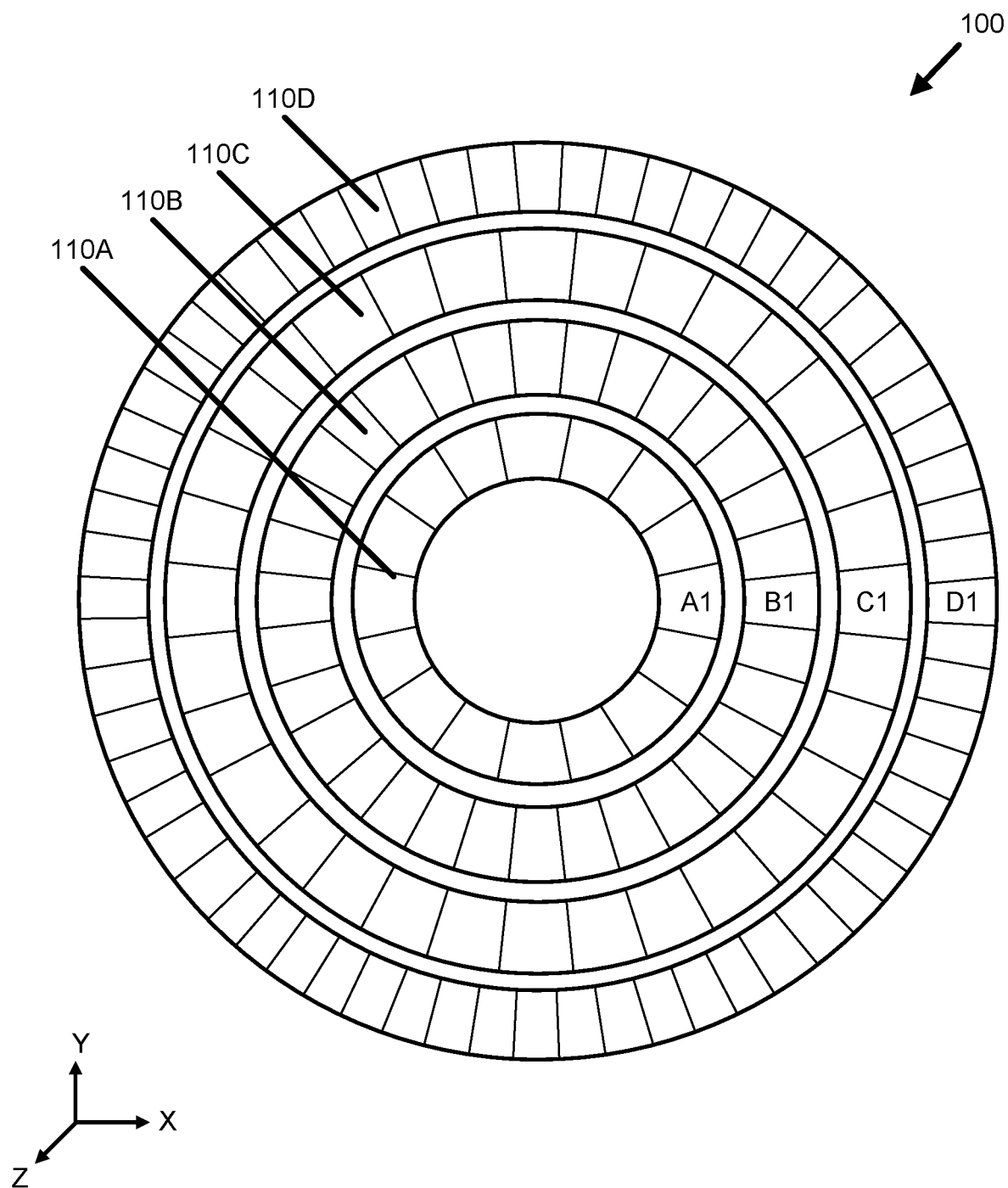

FIGS. 3A and 3B illustrate an example of how the movements of conveyors 110 may be coordinated, according to an embodiment. The illustrated conveyance system 100 comprises four concentric carousel conveyors 110. Each carousel conveyor 110 is divided into wedges 112, for example, with each wedge 112 being represented by a different PTID.

In the illustrated example, processing system 100 determines that it must align the wedges 112, that have been assigned S-vectors, represented by A1, B1, C1, and D1, into a radial line so that, for example, they may all be accessed for an operation using one or more instruments (e.g., robotic pusher) of a station 140. As shown in FIGS. 3A and 3B, A1 on conveyor 110A is rotated clockwise by three indexed positions, B1 on conveyor 110B is rotated counterclockwise by fifteen indexed positions, C1 on conveyor 110C is rotated counterclockwise by seven indexed positions, and D1 on conveyor 110D is rotated clockwise by four indexed positions, to align A1, B1, C1, and D1, on carousels 110A-110D, in the same radial line. Consequently, after the movement, A1 is at position 300A, B1 is at position 300B, C1 is at position 300C, and D1 is at position 300D. Accordingly, all of the wedges 112, identified by A1, B1, C1, and D1, are simultaneously accessible on a single radial line, as shown in FIG. 3B.

In the example of FIGS. 3A and 3B, conveyors 110 are capable of rotating in either direction. Thus, processing system 200 may select a direction of movement for each of conveyors 110 that is most efficient for that particular conveyor 110. Efficiency may be defined as the least amount of movement or number of movements. In this case, processing system 200 may select a direction of movement that requires the least amount of movement to move a particular segment 112 to its destination indexed position. However, in an alternative system 100, conveyors 110 may only move in a single direction, or a different definition of efficiency may be used. For example, efficiency could prioritize a movement which simultaneously moves the most number of segments 112 and/or items 114 into an appropriate position.

Notably, conveyors 110 may be controlled to align any combination of segments 112, across conveyors 110, in a line with each other (e.g., at a station 140, destination system 130, or other system). Thus, processing system 200 may coordinate conveyors 110 to align segments 112, thereby aligning the particular items 114 being held on those segments 112, in order to execute a particular task on the aligned items 114 (e.g., using instrument(s) of a station 140). In this case, each conveyor 110 may convey a set of items 114 that are all related to the same step in an overall task, such that, when segments 112 are aligned, all of the items 114 needed for all of the steps of the task are available on a straight line across conveyors 110. For example, referring to FIG. 3B, a first item 114 for a first step of the task may be located at A1 and accessible at position 300A, a second item 114 for a second step of the task may be located at B1 and accessible at position 300B, a third item 114 for a third step of the task may be located at C1 and accessible at position 300C, and a fourth item 114 for a fourth step of the task may be located at D1 and accessible at position 300D. Using larger numbers of segments, millions or billions of different combinations of items 114 can be quickly aligned serially or in parallel.

2. Process Overview

Embodiments of processes for controlling conveyance system 100 will now be described in detail. It should be understood that the described processes may be embodied in one or more software modules that are executed by one or more hardware processors (e.g., processor 210) of an automated system that comprises conveyance system 100. The described processes may be implemented as instructions represented in source code, object code, and/or machine code. These instructions may be executed directly by the hardware processor(s) 210, or alternatively, may be executed by a virtual machine operating between the object code and the hardware processors 210.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

For the purposes of illustration, the processes will be described herein with reference to a conveyance system 100 comprising a specific number of conveyors 110 in particular configurations. However, these examples are not limiting, and it will be readily apparent to a person of skill in the art how to adapt the described processes to other configurations of cooperating conveyors 110, including different numbers of conveyors 110 and/or different shapes of conveyors 110.

2.1. Software

Processing system 200 may store and execute one or more software modules (e.g., stored in main memory 215 and/or secondary memory 220, and executed by processor(s) 210) that control conveyance system 100. This control may comprise optimizing the timing of movements of conveyors 110 relative to each other and operations being performed (e.g., minimizing dwell time and increasing throughput), implementing required lead times for processing, selecting items 114 for processing, bringing together a collection of items 114 for pick-up and/or processing, and/or the like.

In an embodiment, the control software may utilize artificial intelligence to anticipate the intentions of the automated system and/or human users. For example, the control software may train a machine-learning algorithm to predict the next operation to be performed based on an observed series of events, using historical datasets that have been observed and stored. Additionally or alternatively, artificial intelligence (e.g., employing a convolutional neural network) may be used to recognize and/or classify objects (e.g., items 114) in image data captured by one or more automated reading stations.

Processing system 200 may also store and execute one or more software modules (e.g., stored in main memory 215 and/or secondary memory 220, and executed by processor(s) 210) to analyze data, including image data or other sensed data, produced by the automated system (e.g., by the instruments of one or more stations 140). This analysis may comprise determining and interpreting the results of tests (e.g., based on image data captured by a camera of a reading station), inventorying items 114 (e.g., based on image data of machine-readable indicia captured by a camera of a reading station), mapping items 114 to locations (e.g., S-vectors), mapping S-vectors to G-vectors (e.g., updating PTIDs), and/or the like.

Notably, the same control and analysis software can be used by processing system 200, regardless of the size of the automated system. Thus, the automated system can be scaled up or down as needed or desired for a particular application, without having to develop new software. For example, an automated system may be produced in a small, medium, and/or large version. Regardless of the size of the automated system, the software will optimize operation of conveyance system 100 and analyze the data produced by conveyance system 100.

Processing system 200, executing the control software, may monitor what processes are active on each conveyor 110 at any given time. When no processes are active on a particular conveyor 110 that requires the carousel conveyor 110 to remain stationary, processing system 200 may automatically move the conveyor 110 to position segments 112 of the conveyor that are empty for easier access by an operator (e.g., closer to an openable access point of the automated system for stowing) or other system (e.g., a robotic loading/unloading system) for quicker loading and/or unloading.

Similarly, when it would not interrupt any active processes, the control software, executed by processing system 200, may automatically move one or more conveyors 110 to minimize the distance between the positions of frequently used items 114 and a station 140 at which those frequently used items 114 are operated upon or a destination system 130. For example, during a period of inactivity, the control software may automatically move a segment 112 of a conveyor 110, holding a frequently used item 114, so that it is aligned with an automated station 140. This can decrease the lead time required to start a new operation that involves the frequently used item 114.

In an embodiment, the control software may also optimize operations for scheduled operations. For example, if a plurality of operations are scheduled for a given time and each operation requires certain preparations before the operation can be initiated, the control software, executed by processing system 200, may prioritize the preparations according to lead time. Thus, preparations for the operation with the longest lead time may be given the highest priority and be performed first, whereas the operation with the shortest lead time may be given the lowest priority and be performed last.

The control software may also be sensitive to historical time-of-day loads. For example, the control software may store historical usage data for the automated system, and use that historical usage data to anticipate upcoming needs. For example, if certain items 114 are regularly operated upon at a certain time on a certain day, the control software, executed by processing system 200, may automatically begin preparations for such operations (e.g., moving and/or re-sorting items) with sufficient lead time, such that the preparations will be completed at approximately the particular time on the particular day at which the operations are regularly performed.

2.2. Item Loading/Stowing

In an embodiment, one or more items 114 may be labeled with machine-readable indicia (e.g., barcode, Quick Response (QR) code, alphanumeric string, NFC chip, RFID tag, etc.). At the time that these items 114 are loaded on a conveyor 110, processing system 200 may automatically move conveyor 110, such that each segment 112 on which an item 114 is loaded passes through an automated reading station 140. The automated reading station 140 may read the machine-readable indicia of the item 114 on the segment 112 of conveyor 110 that is currently accessible to the reading station 140 (e.g., via an instrument, such as a camera, barcode reader, NFC chip, RFID interrogator, etc.), to identify the item 114. Because processing system 200 tracks each segment 112 of conveyor 110 (e.g., via its PTID), processing system 200 can also identify which segment 112 is currently accessible to the reading station 140. Thus, processing system 200 may map an identifier of that item 114 to an identifier of the segment 112 (e.g., the S-vector of the segment) of the conveyor 110 on which it has been loaded. This mapped association may be stored (e.g., in memory 215 or 220) until the item 114 is removed from conveyor 110. Advantageously, this association allows the item 114 to be identified in subsequent operations based on its position on conveyor 110, and the position of an item 114 on conveyor 110 to be retrieved using an identifier of the item 114.

In an embodiment which utilizes racks containing a plurality of items 114 (e.g., the same fungible type of item 114), each item 114 within the rack may be given a position identifier identifying its location within that rack prior to the rack being loaded onto a segment 112 of conveyor 110. Once the rack has been placed onto conveyor 110, processing system 200 may compute the S-vector of each item 114 within the rack based on the position (e.g., S-vector) of the rack on conveyor 110 and the position identifier of the item 114 within the rack.

If the automated reading station 140 is only capable of reading the machine-readable indicia while conveyor 110 is stationary, conveyor 110 may rotate to a first indexed position, stop for a sufficient time for the automated reading station 140 to read the machine-readable indicia, rotate to a second indexed position, stop for a sufficient time for the automated reading station 140 to read the next machine-readable indicia, rotate to a third indexed position, and so on and so forth. In an alternative embodiment, the automated reading station 140 may be configured to read machine-readable indicia while conveyor 110 is moving (e.g., via stroboscopic light). In this case, conveyor 110 may simply rotate as much as necessary for all of the machine-readable indicia on conveyor 110 to be read (e.g., a full or partial revolution), at a speed at which the automated reading station 140 is able to read the machine-readable indicia (e.g., synchronized with the stroboscopic light).

In an embodiment (e.g., in which the items 114 are consumer products), items 114 may be stocked on conveyors 110 directly from a delivery truck. At the time of stocking, processing system 200 may generate and store a PTID for each item 114 (e.g., using an automated reading station 140 to identify which items 114 are on which segments 112). Since processing system 200 can preserve and update the PTID for each item 114 as it is transported through the automated system, no further steps are required to identify an item 114 within the automated system. In an embodiment, the PTID history for an item 114 can be preserved across a plurality of facilities throughout the supply and distribution chain (e.g., from a manufacturing facility, to one or more distribution centers, to a brick-and-mortar store, etc.).

In conventional stores, stocking shelves is a labor-intensive, manual process. A human has to visually identify items, move them from a delivery truck to a specific cart in a storeroom, and then move the items from the storeroom to in-store shelves at assigned locations within the store. Current practice is to place similar items together in the same aisle, and label the aisles to help customers find items on their shopping lists. The location of items is maintained at a granular level. Specifically, each item has an SKU, which is assigned a physical location and is represented by a barcode and text on the item. Stockers can read the SKU from the label of an item to determine the physical location in the store at which to place the item, as well as to count inventory for accounting purposes. Customarily, stockers are assigned to particular aisles or sections of aisles, so that they become familiar with every SKU in their assigned locations.

Advantageously, the stocking or stowing process in conveyance system 100 is much easier. Instead of assigning stockers to aisles, conveyors 110 may be loaded with items 114 at one or more designated stowing ports by delivery people (e.g., delivery truck driver). The PTID of each item 114 may be recorded once at the point of loading, such that it does not have to be recorded again. For example, the delivery person may scan machine-readable indicia (e.g., barcode) on an item 114, and processing system 200 may receive the encoded data from this indicia (e.g., item identifier) to identify the item 114, determine a segment 112 of conveyor 110 that is to hold the identified item 114, move the determined segment 112 to the stowing port so that the delivery person may place the item 114 on the determined segment 112, and associate the item 114 with the PTID of the determined segment 112. Alternatively, a delivery person may place an item 114 on an empty segment 112 of conveyor 110, and processing system 200 may automatically read machine-readable indicia on the item 114 (e.g., via a camera or barcode reader at an automated reading station 140), and associate the item 114 with the PTID of the segment 112. It should be understood that any alternative method for associating an item 114 with the PTID of a segment 112 of a conveyor 110 or other holding component may be used.

In an embodiment, several items 114 of the same SKU may occupy a segment 112 that traverses a conveyor 110 in a lateral direction that is orthogonal to the conveyor's longitudinal direction (i.e., direction of movement). In other words, a single segment 112 may comprise a plurality of copies of the same item 114 having the same SKU. These items 114 may be stowed on the segment 112, in a lateral direction, traversing the conveyor 110, such that they can be moved laterally on and/or off the segment 112 (e.g., via helical wire or spring, in a rack, etc.). Processing system 200 may associate each segment 112 with the SKU of items 114 being stowed on the segment 112 (e.g., in secondary memory 220). Each stowing port may comprise a scanning station 140. A delivery person may scan the SKU of an item 114, to be stowed in conveyance system 100, at the scanning station 140. When processing system 200 detects the scan of the SKU at the scanning station 140, it automatically identifies the segment 112, associated with that SKU, and responsively controls or schedules the conveyor 110 to move the identified segment 112 to the stowing port. Thus, the delivery person may stow the items 114, whose SKU was scanned, on the appropriate segment 112, at the stowing port. Advantageously, the delivery person does not have to know where to stow particular items 114, and can stow multiple different items 114 (e.g., with different SKUs), regardless of where they are stowed within conveyance system 100, at the same stowing port.

Stowing could be further improved by shipping items 114 of the same type (e.g., same SKU) in recyclable racks (e.g., with items pushed forward via helical wire) that could just be slid laterally onto whichever segment 112 is at the stowing port. In this case, a delivery person can simply slide a rack, comprising a plurality of items 114, onto the segment 112 at the stowing port. Processing system 200 can calculate the individual PTIDs of all of the items 114 in the rack based on the PTID of the rack and/or segment 112.

In the above manner, the loading of each item 114 into conveyance system 100 can be precisely recorded (e.g., in memory 220). In addition, the unloading of each item 114 from conveyance system 100 (e.g., by a customer pick-up) is also precisely recorded. Thus, a precise real-time inventory of all items 114 in conveyance system 100 can be maintained. This inventory can be reconciled with a real-time inventory that is recorded as segments 112 of conveyors 110 continually pass by automated reading stations 140 that read machine-readable indicia on the items 114 held by those segments 112 to identify those items 114. The inventory of items 114 can be used for automated accounting, automatically reordering new inventory, and/or detecting the need for inventory corrections.

2.3. Automated Item Collection

In an embodiment, conveyance system 100 may be used to automate the collection of consumer products or other items 114 from or in an electronic shopping cart. For example, a customer may select one or more items 114 for purchase from an online store via the Internet, and conveyance system 100 may be used to collect those items 114 within a warehouse for shipping, within a brick-and-mortar store for subsequent pick-up by the customer, and/or the like. As another example, a customer may select one or more items for purchase from an electronic kiosk within a brick-and-mortar store, and a conveyance system 100 within that brick-and-mortar store may automatically collect the item(s) 114 for convenient pick-up at a single location (e.g., storage shelf 132).

In an embodiment, an entire brick-and-mortar store may be converted into an automated system. For example, the typical, fixed display shelves may be entirely or partially replaced by a conveyance system 100, such as the ones illustrated in FIGS. 1A-1F. All of the items 114 for sale at the store may be stored on storage conveyors 110. Processing system 200 may constantly track each item 114 using its associated PTID, and may independently control conveyors 110 to automatically fetch individual items 114 and deliver them to designated locations. Processing system 200 may control each conveyor 110 to move in either direction, at varying speeds, and to stop and start at indexed positions, thereby allowing the automated system to retrieve any PTID-identified item 114 or set of item(s) 114 to any PTID-identified destination.

In an embodiment, the automated system may move any item 114 from one location to another location based on its associated PTID. For example, processing system 200 may receive an S-vector (potentially with a C-vector as well) that is associated with an item 114 to be moved (e.g., from another system, a human operator, etc.). Alternatively, processing system 200 may receive an identifier (e.g., alphanumeric or numeric string, name, type, etc.) of the item 114 (e.g., from another system, a human operator, etc.), and determine the S-vector associated with the item's identifier (e.g., in a relational database). In either case, processing system 200 may look up the G-vector associated with the S-vector. Processing system 200 may also receive or determine the G-vector of the destination to which the item 114 is to be moved. Processing system 200 may then control conveyors 110, stations 140, and/or other robotic components in the automated system to move the item 114 from the source G-vector to the destination G-vector. Processing system 200 may store each movement (e.g., represented by a change in PTID) in a movements table in a relational database (e.g., stored in memory 220), to thereby preserve a recorded history of all of the items' movements.

Figure 4:
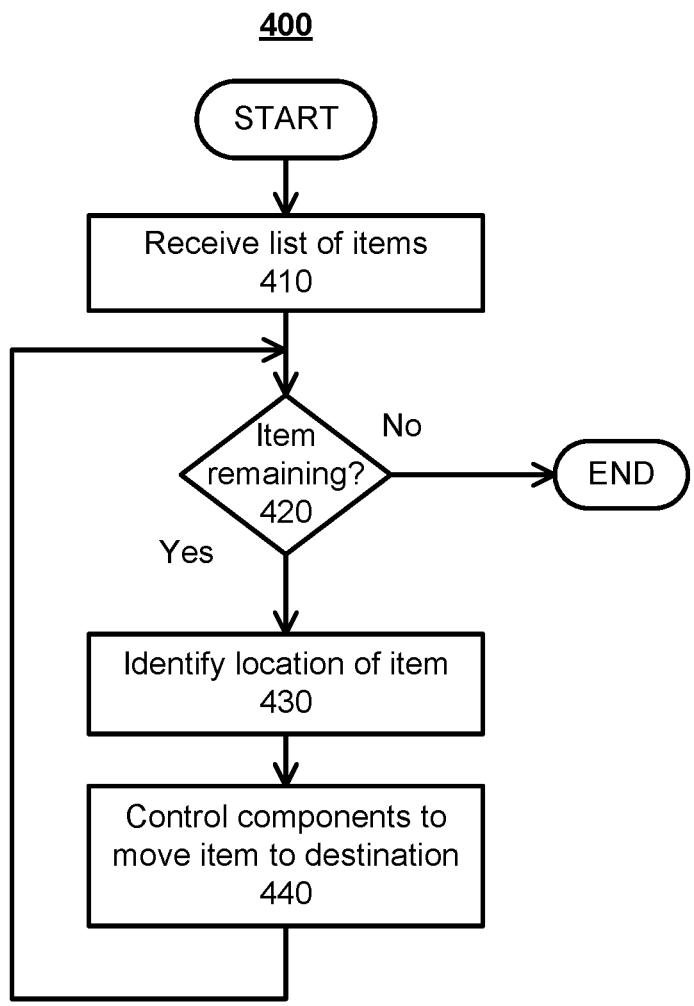
FIG. 4 illustrates the use of a conveyance system in a process for automated item collection, according to an embodiment.

FIG. 4 illustrates the use of conveyance system 100 in a process 400 for collecting items 114, according to an embodiment. Process 400 may be implemented as one or more software modules stored and executed by processing system 200 (e.g., specifically by processor(s) 210) to control the components of conveyance system 100, such as the conveyance systems 100 in FIGS. 1A-1F.

In step 410, processing system 200 receives a list of one or more items 114. The list may be generated by a user via a graphical user interface of an online store or of an electronic kiosk at a brick-and-mortar store. For example, the user may select items 114 through the graphical user interface to be placed into a virtual cart. Once the user has assembled all of the desired items 114 in the virtual cart, the user may initiate or complete a transaction in which the items 114 in the virtual cart are purchased. For example, the user may purchase the items 114 via a conventional online checkout process to be shipped to the user's shipping address or to be collected for pick-up by the user at a brick-and-mortar store. In the event that the user is picking up the items 114 at a brick-and-mortar store, the payment may be completed before pick-up (e.g., via a conventional online checkout process through a graphical user interface) or at the time of pick-up (e.g., via a conventional checkout process by a point-of-sale system).

In steps 420-440, processing system 200 iterates through each item 114 in the list of items 114, received in step 410. These iterations may be performed serially or in parallel. In an embodiment, processing system 200 may prioritize the items 114 to be collected and/or manage movements within conveyance system 100 so as to optimize the collection of the items 114. Optimization may be defined as one or some combination of minimizing movement, minimizing time of collection, and/or minimizing or maximizing some other metric.

In step 420, processing system 200 determines whether any items 114 on the list, received in step 410, remain to be collected. If any item 114 on the list remains to be collected (i.e., "Yes" in step 420), process 400 proceeds to step 430. Otherwise, if no items 114 on the list remain to be collected (i.e., "No" in step 420), process 400 may end.

In step 430, processing system 200 determines the location of the item 114 to be collected. For example, each item 114 in the list may be associated with an item identifier that identifies a specific item 114 or a type of item 114 (e.g., SKU, if the item is fungible). Processing system 200 may map the item identifier to a PTID within conveyance system 100. Initially, the PTID may identify a location (e.g., segment 112) on a storage conveyor 110 or on a fixed storage shelf.

In step 440, processing system 200 controls the components of conveyance system 100 to move the item 114 from its source to its destination. As discussed elsewhere herein, processing system 200 may independently control each conveyor 110 to move (e.g., step) a segment 112 to any precise location. Furthermore, during movement, the PTID of an item 114 may be continually updated so that its S-vector represents its location on a particular conveyor 110 or other holding component and its G-vector represents its location over a ground plane of the automated system. Thus, processing system 200 always knows the coordinates of each item 114 within the automated systems, enabling precise delivery of any item 114 from any source location to any destination location within the automated system. Consequently, in a primary embodiment, processing system 200 is able to find and deliver any specific combination of items 114 from diverse source locations to a single destination location.

Over all iterations of steps 420-440, the items 114 in the list, received in step 410, will be collected at one or more destinations. In an embodiment that collects items 114 for pick-up by a customer, the items 114 are all collected at a single destination, such as a storage shelf 132 in a locker or other location that is accessible directly by the customer or by personnel of the store. In an embodiment that collects items 114 for shipping, the items 114 may be collected in a single receptacle (e.g., bin 160) and delivered to a packing area for manual or automated packing into a shipping box or other container.

Processing system 200 may perform multiple iterations of process 400 (e.g., for a plurality of distinct lists of items 114) and/or step 440 (e.g., for a plurality of items 114) serially or in parallel. In this case, processing system 200 may increase efficiency by using a single move to complete a plurality of tasks. Specifically, segments 112 of each conveyor 110 move together, like train cars. Thus, the movement of one segment 112 of a conveyor 110 also pulls all other segments 112 of the same conveyor 110 with it. In an embodiment, processing system 200 may select and place items 114 to take advantage of this feature of conveyors 110. For example, processing system 200 may place items 114 (e.g., in the same list or different lists) going to nearby destinations close to each other on the same conveyor 110, and preferably in positions in which they can be simultaneously unloaded at their destinations (e.g., on adjacent segments 112 of the conveyor 110 if the destinations are also adjacent, spaced apart by the same distance as the destinations, etc.). In this manner, a plurality of items 114 can be moved to a plurality of different destinations in a single move and/or moved on and/or off transport conveyor 110 in parallel, thereby multiplying the throughput of the automated system by the number of destinations that can be serviced in the same move.

The control software, executed by processing system 200, may optimize collection of lists of items 114 to minimize contention and maximize performance of conveyance system 100. Specifically, processing system 200 may contemporaneously or simultaneously receive a plurality of lists of items 114 from a plurality of customers. In addition, there may be contention for conveyors 110 when stockers require access to conveyors 110. Thus, the control software may implement policies to minimize these contentions and dwell times, such as time-sharing a plurality of conveyors 110 for loading and unloading, scheduling deliveries for slow sales hours, and/or the like.

2.4. In-Store Pick-Up

Conveyance system 100 may be used for in-store pick-up, such as in micro-fulfillment systems (MFCs). A customer may use a website or mobile app to build a virtual cart from items 114 at a selected store and checkout, thereby completing a purchase of one or more items 114 from the selected store. A web application, through which the purchase is made, may communicate the list of items 114, via one or more networks (e.g., the Internet), to an automated system at the selected store.

The automated system's reception of the list of items 114 triggers process 400 and represents step 410. In this case, conveyance system may retrieve and deliver all of the items 114 in the list to a storage shelf 132 in a locker at or near the front of the store. An identifier (e.g., alphanumeric or numeric string) and/or location of the locker may be provided to the customer (e.g., via a graphical user interface of a mobile app executing on the customer's smartphone, via text message, etc.). For example, the customer's mobile app may guide the customer to a particular locker number. The customer may then open the locker using the mobile app and/or credentials (e.g., code, password, etc.) provided by the mobile app, and retrieve the items 114 which the customer purchased from the locker. Alternatively, personnel of the store may retrieve the items 114 from the locker and deliver them to the customer (e.g., at a pick-up counter, curb-side, etc.).

FIGS. 1C-1F can be used to illustrate examples of conveyance system 100 for in-store pickup. In such an embodiment, storage systems 120 may comprise one or more storage conveyors 110. Different storage systems 120 may be the same size or different sizes, depending on floor space, design, intended use, and/or the like.

One or more transport conveyors 110 may weave in and out of storage systems 120 to form a comb shape with a plurality of teeth or fingers in plan view, as illustrated in FIGS. 1C and 1D. This enables each conveyor 110 to be longer, and therefore, able to store more items 114 in a given space (albeit, with longer average delivery paths). Alternatively, transport conveyor(s) 110 may pass by one or more access points (e.g., chutes 150) at each storage system 120, as illustrated in FIGS. 1E and 1F. Conveyance system 100 may comprise a single transport conveyor 110 or a plurality of transport conveyors 110. Transport conveyors 110 may be nested and parallel, but do not necessarily need to be nested or parallel. For example, different transport conveyors 110 may service different subsets of storage systems 120.

Process 400 may be applied to the conveyance systems 100, illustrated in FIGS. 1C-1F, to collect items 114 and deliver them to a pick-up shelf 132 of a destination system 130. Destination system 130 may comprise a plurality of lockers (e.g., at the front of the store), with each locker containing one or more pick-up shelves 132.

In step 410, an order, comprising a list of one or more items 114 selected by a customer, is received by processing system 200. In steps 420-440, in response to the order, processing system 200 controls one or more of conveyors 110 to retrieve each item 114 in the list from storage systems 120. For example, an empty segment 112 of transport conveyor 110X may be moved adjacent to a first storage conveyor 110 to receive a first item 114 from the list, the same segment 112 or a different segment 112 may be moved adjacent to the first storage conveyor 110 or a second storage conveyor 110 to receive a second item 114, and so on and so forth. Once the destination segment 112 of the transport conveyor 110X has been moved adjacent to a storage conveyor 110, the automated system may move the item 114 from that storage conveyor 110 onto the destination segment 112, via any known mechanism (e.g., dropping into a chute, dropping over the destination segment 112, pushing with a robotic pusher, pulling with a robotic gripper, etc.). In embodiments in which stacked transport conveyors 110X are utilized, storage conveyors 110 may be stacked at the same height intervals as transport conveyors 110X are stacked, so that the holding surface of each storage conveyor 110 is in substantially the same plane as the holding surface of a transport conveyor 110X or slightly above the plane of the holding surface of a transport conveyor 110X. In addition, each storage conveyor 110 may be flush with transport conveyor 110X or with little spacing in between, or above and slightly overlapping transport conveyor 110X, such that items 114 may be easily moved (e.g., pushed) between storage conveyor 110 and transport conveyor 110X.

In an embodiment, processing system 200 may minimize movement by using a plurality of segments 112 to simultaneously retrieve a plurality of items 114. For example, processing system 200 could move transport conveyor 110X, such that an empty segment 112 is available at a storage conveyor 110 for each of a plurality of items 114 at once. Then, each storage conveyor 110 with one of the plurality of items 114 may move its respective item 114 onto the available empty segment 112 at the same time as the other storage conveyors 110. Thus, only a single move is required to position conveyor 110, and only a single move is required to move all of the items 114 onto transport conveyor 110X. As an example, assume that storage system 120A holds a first item 114 in the list on a first storage conveyor 110, storage system 120C holds a second item 114 in the list on a second storage conveyor 110, and storage system 120G holds a third item 114 in the list on a third storage conveyor 110. Processing system 200 may control transport conveyor 110X to move the minimum amount of steps that simultaneously places a first empty segment 112 in front of the first storage conveyor 110, a second empty segment 112 in front of the second storage conveyor 110, and a third empty segment 112 in front of the third storage conveyor 110. Then, each of storage systems 120A, 120C, and 120G may be simultaneously controlled to move the first item 114 from the first storage conveyor 110 onto the first empty segment 112, push the second item 114 from the second storage conveyor 110 onto the second empty segment 112, and push the third item 114 from the third storage conveyor 110 onto the third empty segment 112. If transport conveyor 110X cannot accommodate all of the items at once or a single transport conveyor 110X cannot access every item 114 on the list (e.g., only certain transport conveyors 110X have access to certain items 114), this process may be repeated for two or more subsets of the items 114 and/or for two or more transport conveyors 110X.

Once a subset of one or more of the items 114 in the list have been placed on conveyor(s) 110 (e.g., as many as can be accommodated in a single move), processing system 200 controls transport conveyor(s) 110X to deliver each placed item to a single pick-up shelf 132 in destination system 130. As an example, assume that transport conveyor 110X holds a first item 114 in the list on a first segment 112, a second item 114 in the list on a second segment 112, and a third item 114 in the list on a third segment 112. Processing system 200 may select a destination pick-up shelf 132. Assuming that the first segment 112 is closest to the selected pick-up shelf 132, and the third segment 112 is farthest from the selected pick-up shelf 132, processing system 200 will then control transport conveyor 110X to position the first segment 112 adjacent to the back of the selected pick-up shelf 132, move the item 114 from the first segment 112 onto the selected pick-up shelf 132 (e.g., using a robotic pusher), control transport conveyor 110X to position the second segment 112 adjacent to the back of the selected pick-up shelf 132, move the item 114 from the second segment 112 onto the selected pick-up shelf 132, control transport conveyor 110X to position the third segment 112 adjacent to the back of the selected pick-up shelf 132, and move the item 114 from the third segment 112 onto the selected pick-up shelf 132.

Once all items 114 from the list have been moved to the selected pick-up shelf 132, processing system 200 may notify a web application or other system that notifies the customer who created the list. This notification may comprise an identifier of the selected pick-up shelf 132, as well as instructions or credentials for accessing the pick-up shelf 132. In an embodiment in which destination system 130 comprises storage lockers, the identifier may comprise a locker number, and the notification may comprise a code for opening the locker. Consequently, the customer may proceed to the identified locker, use the code to open the locker, and retrieve the collection of items 114 from the customer's list off of the pick-up shelf 132. It is estimated that, with eight stacked conveyors 110, cooperating in parallel, a shopping list of forty-five items 114 can be collected into a pick-up shelf 132 within four minutes, without any manual intervention.

If a customer delays pick-up, such that a collection of ordered items 114 remains on a pick-up shelf 132 for a predetermined time period (e.g., longer than seven days), the pick-up shelf 132 may be cleared. In an embodiment, the pick-up shelf 132 may be automatically cleared using the reverse of process 400, to return the items 114 to their storage conveyors 110 using transport conveyor 110X. Alternatively, processing system 200 may automatically notify personnel, along with the identifier of the pick-up shelf 132, so that the personnel may remove the items from the pick-up shelf 132 and restock the items 114 on storage conveyors 110.

One concrete example is an in-store or dedicated pharmacy. Human pharmacists could be replaced by a fully autonomous conveyance system 100. A customer may conduct a transaction for his or her prescription with the system 100 (e.g., register and pay, using cash, credit card, or other payment means, via an electronic point-of-sale kiosk), and processing system 200 may responsively control conveyance system 100 to collect and deposit the prescription (e.g., which may comprise multiple drug containers) into a bin in front of the customer. Routine procedures may be implemented to provide the customer with instructions for using the prescription drug(s) (e.g., via a recorded video or video call played on the kiosk), as well as to validate the transaction (e.g., providing the customer with a receipt for exiting the store in the case that it is an in-store pharmacy).

2.5. Automated Store

The automated system, described above, with respect to in-store pick-up can also be adapted to an entire automated store. Specifically, the automated system may be coextensive with the store (e.g., an MFC). All purchases may be made through an online app and/or electronic kiosks at the store site. Customers may create their lists of items 114, and the automated store may utilize conveyance system 100 to collect the list of items 114 at a pick-up locker, which the customer can then access.

Thus, customers do not even need to be given access to the inside of the store. A particular automated store may operate without any on-site personnel (e.g., in place of a grocery store, convenience store, etc.). For example, storage conveyors 110 and/or shelves may be restocked by delivery drivers via external access (e.g., a loading area 170) to the automated store. Delivery drivers and/or other personnel may also correct any detected inventory errors. Maintenance engineers may be dispatched for routine maintenance of conveyance system 100, to fix software, electrical, and mechanical errors, and/or the like. Customers may perform their own checkouts, and any customer service may be provided through a mobile app, user interface of an electronic kiosk, phone call, and/or the like, using remote operators and/or artificial intelligence (e.g., chatbot).

Since there is no need to display items 114 to customers within an automated store, there is no need to assigned SKUs to specific locations, as in conventional stores. A delivery driver or other stocker may simply place an item 114 on any empty segment 112 on a transport conveyor 110 (e.g., at a stowing port). Machine-readable indicia on the item 114 may be read by an automated reading station 140 (e.g., using a camera or barcode reader), and the item 114 may be automatically associated with the PTID of the segment 112 on which it was placed. Processing system 200 may then distribute the items 114 on holding components (e.g., storage conveyors 110, storage shelves, etc.) according to any optimization strategy (e.g., to minimize movement within the automated store during the collection of items 114).

Thus, the automated store replaces and speeds up the labor-intensive and manual stocking process of conventional stores. Processing system 200 can control which segments 112 are presented to stockers, such that no training or only trivial training of stockers is required. This enables delivery drivers or any person without prior training to become a stocker. In addition, processing system 200 is able to automatically maintain very precise inventory, eliminating the need for manual inventory inspections. Accordingly, the conveyance system 100 is able to eliminate or reduce costs for labor, training, inventory management, accounting and record-keeping, and more, in addition to providing for leaner inventories, reducing out-of-stock events, and increasing efficiency in the supply chain.

In an embodiment, cameras may be placed inside the automated store (e.g., within automated reading stations 140) to allow continuous inspection of conveyors 110 as they pass the cameras and/or other components of conveyance system 100. Processing system 200 may analyze image data, captured by the cameras, to perform real-time inventory of items 114 within the automated store and/or quality-control of conveyors 110 and/or other components, the integrity of the PTID system, and/or the like. If a problem is detected, processing system 200 may alert a human technician and/or automatically dispatch a maintenance engineer to correct the problem. Notably, a plurality of automated stores may be monitored from a single, central control room.

The automated store requires many less square feet than a conventional store to provide the same number of items 114, because there is no need for aisles, checkout areas, cart storage, storerooms, and/or the like, and very tall vertical storage can be used. It is estimated that the function of a conventional store of 35,000 square feet can be performed by an automated store of only 10,000 square feet. Thus, the automated store can be operated at much less expense, due to reductions in the costs for employees, air conditioning and heating, real estate expenses, and/or the like.

The size of the automated store may depend on its intended usage, the types of items 114 that are to be sold in the store, the desired store footprint, and/or the like. Conveyors 110 can be scaled up or down in size as needed, as long as there is sufficient overall length in the storage conveyors 110 to hold all of the items 114 to be provided by the automated store. Larger stores may require larger conveyors 110 and more time between order and pick-up, but there is no intrinsic limit on the scale of the conveyance system 100. Thus, the automated store may be the size of a big-box store, regular grocery store, minimarket, or vending machine, and anywhere between or beyond. Advantageously, regardless of the chosen size of the automated store, the software and other processes used by conveyance system 100 may be the same.

In an automated store which does not allow customers inside, customers will no longer be able to walk the aisles looking for items to purchase, as they would in a conventional store. However, such an experience may be emulated in the graphical user interface of an online website or mobile app via the customer's device, or an electronic kiosk at the automated store. The graphical user interface may pictorially display all of the items 114 available in the automated store, and allow the customer to select items 114 to add them to a virtual cart. The graphical user interface may display the items 114 on shelves and in aisles, for example in virtual reality, so that customers can "walk" the aisles and "touch" virtual items to add them to the virtual cart, similarly to how they would in a real store.

In an embodiment, the automated store may provide for substitutions when an item 114 goes out of stock. Specifically, processing system 200 may inventory all items 114 within the automated store, in real time, as described elsewhere herein. Thus, processing system 200 may detect when an ordered item 114 is out of stock, and alert the customer, ordering the item 114, via a mobile app or other graphical user interface or messaging means. Processing system 200 may also automatically suggest one or more substitute items 114 that are known to be in stock based on the managed real-time inventory. Via the graphical user interface, the customer may select one of the substitute items 114 or simply forgo the out-of-stock item 114.

If a customer delays pick-up, such that a collection of ordered items 114 remains on a pick-up shelf 132 for a predetermined time period (e.g., longer than seven days), the pick-up shelf 132 may be automatically cleared. For example, the pick-up shelf 132 may be automatically cleared using the reverse of process 400, to return the items 114 to their storage conveyors 110 using transport conveyor 110X.

In an embodiment, the automated store may also be configured to accept returns. In this case, a return booth may be provided at a designated location on the exterior of the automated store (e.g., near destination system 130). The return booth may provide access to a shelf on which to place the items 114 to be returned, and a robotic system (e.g., pusher, grabber, etc.) may move the items to a conveyor 110. Alternatively, the return booth may provide direct access to an empty segment 112 of a conveyor 110. In either case, conveyor 110 can move the returned items 114 to a designated location (e.g., a storage conveyor 110, an area, such as a loading area 170, that is accessible to a stocker who can re-stow the item 114 into conveyance system 100, etc.). Alternatively, a stocker may access the return booth as needed to manage the returned items 114.

It should be understood that the automated store may be implemented using any of the conveyance systems 100 illustrated in FIGS. 1A-1F, or other configurations of a conveyance system 100. As one example, the automated store may comprise a circular building with walls closely encircling stacked circular carousel conveyors 110, illustrated in FIGS. 1A and 1B. Each carousel conveyor 110 may rotate on a rail, driven by rack and pinion and a powerful electric motor controlled by processing system 200. The building may also comprise pick-up lockers as destination system 130 and stowing ports to be used for stocking items 114 on the carousel conveyors 110.

As another example, the automated store may be a mini-store comprising an industry-standard forty-foot shipping container. The container may comprise eight stacked elliptical carousel storage conveyors 110 with six-hundred-forty feet of holding length. Carousel conveyors 110 may service pick-up lockers (e.g., twenty lockers) on one side of the container. The pick-up lockers may be independent from the container, such that any container can be dropped behind and aligned with the pick-up lockers to begin servicing the pick-up lockers. In this case, the pick-up lockers could be attachable and detachable from the container or may simply sit in front of the container without being attached to the container.

Such a container store may store a limited, but useful, range of items 114. However, the range of available inventory may be easily extended by simply placing a plurality of container stores, each holding different items 114, together. In this case, customers may visit a plurality of pick-up lockers at different container stores to pick up all of their desired items, similar to visiting several shops in a market.

When a container store runs out of inventory, it can simply be replaced by a new, fully stocked container store. In this case, the container stores may not even comprise regular stowing ports for restocking. While access may still be provided to the interior of the container store, so that depleted container stores can be restocked and reused, easy access does not have to be provided for regular restocking.

For example, a depleted container store may be removed from its location and transported (e.g., on a truck, ship, train, etc.) to a central distribution center. At the central distribution center, the interior of the container store may be accessed so that items 114 can be restocked on storage conveyors 110. The restocked container store may then be transported to its original location or provided to a new location (e.g., if the original location has already been provided with a new container store), as desired.

2.6. Facility for Online Store

Conveyance system 100 may be used for an online store. A customer may use a website or mobile app to build a virtual cart from items 114 at the online store and checkout, thereby completing a purchase of one or more items 114 from the online store. A web application, through which the purchase is made, may communicate the list of items 114, via one or more networks (e.g., the Internet), to an automated system at one or more warehouses, distribution centers, or other facilities of the online store.

The automated system's reception of the list of items 114 triggers process 400 and represents step 410. In this case, conveyance system 100 may retrieve and deliver all of the items 114 in the list to a single location in a packing area within the facility. It should be understood that items 114 may be retrieved from storage conveyors 110 and delivered to a singular location of a destination system 130 in a similar or identical manner as described elsewhere herein with respect to automated pick-up and automated stores (e.g., as illustrated with respect to FIGS. 1C-1F and 4). However, instead of the singular location being a shelf 132 in a customer-accessible area (e.g., locker), the singular location is a packing area. Subsequently, a robotic system or human may pack the items 114, collected in the packing area, into shipping containers to be delivered to a mailing address of the customer via conventional shipping means (e.g., via a shipping service which may utilize cargo planes, freight trains, trucks, delivery personnel, independent contractors, etc.).

It is estimated that conveyance system 100 can drastically improve throughput at warehouses for online stores, such as those for Amazon™. For example, in the embodiment illustrated in FIGS. 1E and 1F, assume there are twenty storage systems 120, each with twenty stacked storage conveyors 110A. Also assume that each of the twenty levels of each storage system 120 comprises a station 140 with twenty robotic pushers, and each robotic pusher is aligned with a segment 112 of the respective storage conveyor 110A and a chute 150, so that twenty items 114 can be simultaneously pushed from the same storage conveyor 110A into chutes 150 and travel down to a bin 160 on transport conveyor 110X. Because all operations can be performed in parallel, simple, easy, and rapid parallel access can be provided to every item 114 in the automated system. For example, four-hundred bins 160 can be filled with four-hundred items 114 in parallel in a single operation that takes, for example, twenty seconds. That translates to roughly seventy-two-thousand retrievals every hour. Of course, the number of storage systems 120 and/or storage conveyors 110A may be scaled up, and the average push-operation time may be reduced from twenty seconds (e.g., if storage conveyor 110A must be stationary during a push) to five seconds or less (e.g., if storage conveyor 110A may continue moving during a push). To further improve the throughput rate, the control software, executed by processing system 200, may optimize placement of items 114 (e.g., by placing popular or frequently accessed items 114 together on storage conveyors 110A), the order of push operations to shorten the path length that items 114 have to travel, and/or the like.

As another example, suppose that a warehouse must store two-hundred-thousand items 114. Conveyance system 100 may be constructed with one-thousand storage conveyors 110 that are each sized to hold two-hundred items 114. Assuming that each segment 112 of storage conveyors 110 must be twelve inches in width to accommodate an item 114, each storage conveyor 110 would have a perimeter length of two-hundred feet. This means that the longest retrieval would be one-hundred feet. However, frequently used items 114 may be placed closer to stations 140, such that long retrievals are minimized. The average retrieval time for an item 114 may be ten seconds, and the time required to push an item 114 at station 140 into a bin 160 may be approximately five seconds, resulting in a total retrieval time of fifteen seconds, or a rate of four retrievals per minute. In such a conveyance system 100, approximately 5.6 million items 114 may be retrieved per day, which translates to over two billion retrievals per year.

2.7. Inventory Management in a Supply Chain

Conveyance system 100 may be used for central distribution centers within a supply chain. For example, in a supermarket supply chain, suppliers are continually shipping items 114 to distribution centers, which then collect and ship needed items 114 to local stores at various locations. Conveyance system 100 may be used in these central distribution centers to collect all of the items 114 needed for a local store, and deliver those items 114 to a singular pick-up location within the central distribution center (e.g., similar to how items 114 may be delivered to a pick-up locker in a store or a packing area in a warehouse, as described elsewhere herein). Then, the collection of items 114 simply has to be moved from the pick-up location onto a delivery truck for distribution to the associated local store. In other words, conveyance system 100 can be used to collect the items 114 in the "shopping lists" of local stores, based on inventory deficits at the local stores.

It should be understood that the process for collecting items 114 for these large store-wide lists of items 114 is the same as the process for collecting items 114 on individual customers' shopping lists. The only difference is that conveyors 110 will need to be larger and potentially more numerous to accommodate all of the items 114 flowing through a central distribution center.

Notably, if the local stores implement conveyance system 100, as described elsewhere herein, the processing system 200 of the automated system in each local store will maintain a precise, real-time inventory of all items 114 in that local store. Thus, the processing system 200 may automatically generate a precise list of items 114 needed for the local store based on the real-time inventory, and automatically transmit this list to a processing system 200 in the central distribution center. Processing system 200 of the central distribution center may receive this list, thereby triggering process step 410 of process 400, to deliver all items 114 in the list to a delivery truck. The delivery truck may transport all of the items 114 to the local store, and the delivery driver may stock items 114 from the truck into a conveyance system 100 at the local store, as described elsewhere herein. Notably, each of the items loaded into the local store will then be precisely tracked in real time by processing system 200 of the local store, and the cycle may repeat over and over again for a plurality of local stores.

In an embodiment, items 114 in a list for a local store may be provided to a loading area in a particular order so that the items 114 are loaded onto the delivery truck in that particular order. The order may be chosen to optimize stocking at the local store. For example, items 114 which are stored near each other on storage conveyors 110 at the local store may be ordered near each other during loading of the delivery truck. Thus, those items 114 also come off the delivery truck and are loaded into the conveyance system 100 near each other and at similar times. As a more specific example, suppose, at a local store, a first item 114 is stored on a segment 112 of a storage conveyor 110 that is farthest from the loading port, a third item 114 is stored on a segment 112 of a storage conveyor 110 that is closest to the loading port, and a second item 114 is stored on a segment 112 of a storage conveyor 110 that is in the middle of these farthest and closest positions. In this case, the conveyance system 100 of the central distribution center may order the items for loading into the delivery truck, such that the third item 114 is loaded first (e.g., farthest from the back door of the truck), the second item 114 is loaded second, and the first item 114 is loaded third (e.g., closest to the back door of the truck). Consequently, the items are unloaded and loaded into the conveyance system 100 at the local store, such that the first item is loaded first (e.g., since it is closest to the back door of the truck), the second item is loaded second, and the third item is loaded third (e.g., since it is farthest from the back door of the truck).

Similarly, items 114 from lists for different local stores may be grouped into batches and loaded onto a single delivery truck in an optimized order. The optimized order may be based on the delivery truck's planned route to the local stores. For example, suppose that the delivery truck is planning to visit a first local store first, a second local store second, and a third local store third. In this case, processing system 200 may control conveyance system 100 to deliver, to a pick-up area in the central distribution center, the batch for the third local store first, the batch for the second local store second, and the batch for the first local store third, so that they are loaded into the delivery truck in this order. Consequently, the batch for the first local store will be closest to the back door of the delivery truck so that it can be easily unloaded first, the batch for the second local store will be in the middle so that it can be unloaded second, and the batch for the third local store will be farthest from the back door of the delivery truck so that it can be unloaded third. This optimizes delivery by ensuring that, when a batch is to be offloaded, it is not blocked from being offloaded by any other batch in the delivery truck.

2.8. Other Applications

Disclosed embodiments may be utilized and adapted for other applications than those described above, on a micro or macro scale. For instance, any system, which must coordinate the movements of disparate items for a particular purpose or re-sort items into new locations, can benefit from the disclosed conveyance system 100. Such systems include, without limitation, automated diagnostic instruments, assembling components into a product on a manufacturing production line, the preparation of various dishes in a restaurant kitchen, assembling outfits for a personal shopper in a high-end clothing store, and/or the like. It should be understood that the disclosed conveyance system 100 may vary in size and scale, depending on its application, from, for example, the size of an automated diagnostic system to a large fulfillment center comprising a million square feet. All such systems stow, pick, carry, and sort items into specific sets. Advantageously, conveyance system 100 can result in lower costs from less expensive manufacturing assembly and warehouse installation, a single simpler navigational system, simpler robotics, simpler power systems, longer mean time between failures (MTBF), quicker response times to failures, faster throughput, better data analytics, and/or the like.

In a clinical laboratory, patient samples are tested for up to three-hundred different analytes (e.g., glucose, cholesterol, hemoglobin, etc.) with several different species of analytical module (e.g., chemistry, immunoassay, chemiluminescence, ion selective electrode (ISE), hematology, immunohematology, coagulation, nucleic acid test (NAT), etc.). Clinical labs utilize multiple automated diagnostic instruments, each dedicated to one particular species of test procedure, and each stocked with the reaction tubes, reagents, and samples necessary for running its particular species of test procedure. Oftentimes, seventy different reagents are stored in a particular instrument for the various test runs. Each instrument has its own pre-analytic and post-analytic modules and stock of cuvettes, reagents, and samples, and robotically picks and places items, as required, through various steps in the test procedure. In addition, samples from particular patients have to be distributed to several different instruments, which is very labor-intensive. Furthermore, to meet throughput requirements, clinical labs often utilize a plurality of copies of the same full-scale instrument, which may each cost $250,000.

In a particular implementation, the disclosed conveyance system 100 may be used in a single automated diagnostic instrument to store or install all species of analytical modules on board, serviced by common pre-analytic and post-analytic modules. In other words, conveyance system 100 enables a universal diagnostic instrument (UDI) that could perform any subset of a clinical lab's menu of tests (e.g., three-hundred or more different test procedures) on a sample, as ordered by a physician. Such a UDI would be very desirable for both logistical and cost reasons.

The UDI may comprise a conveyance system 100 in which all species of analytic modules are interfaced in series along the same intelligent concentric carousel conveyors 110. A common store of cuvettes, reagents, and samples could server all of these analytic modules. Specifically, the concentric carousel conveyors 110 may rotate to distribute cuvettes, reagents, and samples to each analytic module, when required, as discussed elsewhere herein. Advantageously, only the analytic module of each diagnostic instrument is required for each species of test, rather than each large, bulky, expensive instrument itself. Notably, analytic modules represent only 20% of the cost of a complete diagnostic instrument. In addition, to increase throughput, the UDI may comprise multiple copies of the same analytic module.

Advantageously, the movement of items 114 (e.g., samples, reagents, cuvettes, etc.) through the various processing stations 140 required for the various tests, within the UDI, can be done by the carousel conveyors 110 themselves. This obviates the need for robotic movers. In addition, if the analytic modules are appropriately spaced apart from each other, it becomes possible to synchronize their operations, such that the same set of movements, required for one analytic station 140, simultaneously performs the same set of movements, required for all analytic stations 140, but with different sets of items 114 (e.g., cuvettes, reagents, samples, etc.). In other words, analytic stations 140 are utilized in parallel via the synchrony of movements within conveyance system 100.

As another example, conveyance system 100 may be used for manufacturing or assembly. Specifically, a team of coordinated storage conveyors 110 may be used to bring components, as items 114, to a human or robotic assembler for assembly (e.g., into a composite object). Movements may be scheduled to bring the right component (e.g., W-vector) to the right place (e.g., C-vector, S-vector, and/or G-vector) at the right time (e.g., T-vector). For instance, in an automobile production line, many variants of a vehicle model are manufactured, often as specified by a buyer, in a range from a basic model to a fully loaded model. Processing system 200 could bring up the right parts for each individual vehicle model being constructed, and do so in the right order and with the right timing.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system comprising:
   at least one transport conveyor, wherein the at least one transport conveyor comprises a belt with a plurality of segments that are each configured to hold at least one item and move in tandem with each other;
   a plurality of storage conveyors, wherein each of the plurality of storage conveyors comprises a belt with a plurality of segments that are each configured to hold at least one item and move in tandem with each other, and wherein each of the plurality of storage conveyors comprises a portion that is aligned with a portion of the at least one transport conveyor, such that items are moveable from any one of the plurality of segments in the storage conveyor to any one of the plurality of segments in the at least one transport conveyor;
   at least one hardware processor; and
   one or more software modules configured to, when executed by the at least one hardware processor,
     receive an instruction to collect one or more items at a single destination location, and,
     for each of the one or more items,
       identify one of the plurality of segments in one of the plurality of storage conveyors on which the item is held,
       control the one storage conveyor to align the identified segment with one of the plurality of segments in the at least one transport conveyor,
       move the item from the identified segment in the one storage conveyor onto the one segment in the at least one transport conveyor,
       control the at least one transport conveyor to align the one segment in the at least one transport conveyor with the single destination location, and
       move the item from the one segment in the at least one transport conveyor to the single destination location.

2. The system of claim 1, wherein the at least one hardware processor is configured to independently control each of the at least one transport conveyor and the plurality of storage conveyors to move independently from each other.

3. The system of claim 2, wherein each of the at least one transport conveyor and the plurality of storage conveyors are configured to move in two directions.

4. The system of claim 1, wherein each of the plurality of storage conveyors is oriented to move in a direction that is orthogonal to a direction of movement of the portion of the at least one transport conveyor with which the storage conveyor is aligned.

5. The system of claim 4, wherein each of the plurality of storage conveyors comprises a vertical loop, wherein a holding surface of each of the plurality of storage conveyors is positioned above a holding surface of the at least one transport conveyor, and wherein moving the item from the identified segment in the one storage conveyor onto the one segment in the at least one transport conveyor comprises moving the identified segment towards the at least one transport conveyor until the item drops off the one storage conveyor onto the holding surface of the at least one transport conveyor.

6. The system of claim 1, wherein the portion of each of the plurality of storage conveyors that is aligned with the portion of the at least one transport conveyor moves in a direction that is parallel to a direction of movement of the portion of the at least one transport conveyor with which the portion of the storage conveyor is aligned.

7. The system of claim 6, wherein each of the plurality of storage conveyors comprises a horizontal loop, and wherein a holding surface of each of the plurality of storage conveyors is positioned above a holding surface of the at least one transport conveyor.

8. The system of claim 7, further comprising a downward slide path from the holding surface of each of the plurality of storage conveyors to the holding surface of the at least one transport conveyor, wherein moving the item from the identified segment in the one storage conveyor onto the one segment in the at least one transport conveyor comprises pushing the item onto the downward slide path to cause the item to slide onto the holding surface of the at least one transport conveyor.

9. The system of claim 7, wherein moving the item from the identified segment in the one storage conveyor onto the one segment in the at least one transport conveyor comprises:
pushing the item onto a downward slide path to cause the item to slide into a bin at an end of the downward slide path; and
pushing the bin onto the holding surface of the at least one transport conveyor.

10. The system of claim 1, wherein each of the plurality of storage conveyors is configured to move in two directions, and wherein the one or more software modules are configured to, when executed by the at least one hardware processor:
determine in which of the two directions to move the one storage conveyor so as to minimize movement; and
control the one storage conveyor to move in the determined direction.

11. The system of claim 1, further comprising one or more reading stations comprising a reader device configured to read a characteristic of an item held on any of the plurality of segments of at least one of the at least one transport conveyor or the plurality of storage conveyors.

12. The system of claim 1, wherein the system comprises:
a building that encloses the at least one transport conveyor and the plurality of storage conveyors; and
a destination system comprising a plurality of destination locations, including the single destination location, that are accessible to the at least one transport conveyor.

13. The system of claim 1, wherein the one or more software modules are further configured to, when executed by the at least one hardware processor:
receive the instruction to collect the one or more items from a web application via at least one network; and
provide an identifier of the single destination location to the web application via the at least one network.

14. The system of claim 1, wherein at least one of the one or more items comprises one or more of a cuvette, reagent, or sample.

15. A method comprising using at least one hardware processor, within an automated system that comprises at least one transport conveyor and a plurality of storage conveyors, the at least one transport conveyor comprising a belt with a plurality of segments that are each configured to hold at least one item and move in tandem with each other, each of the plurality of storage conveyors comprising a belt with a plurality of segments that are each configured to hold at least one item and move in tandem with each other, and each of the plurality of storage conveyors comprising a portion that is aligned with a portion of the at least one transport conveyor such that items are moveable from any one of the plurality of segments in the storage conveyor to any one of the plurality of segments in the at least one transport conveyor, to:
receive an instruction to collect one or more items at a single destination location; and,
for each of the one or more items,
identify one of the plurality of segments in one of the plurality of storage conveyors on which the item is held,
control the one storage conveyor to align the identified segment with one of the plurality of segments in the at least one transport conveyor,
move the item from the identified segment in the one storage conveyor onto the one segment in the at least one transport conveyor,
control the at least one transport conveyor to align the one segment in the at least one transport conveyor with the single destination location, and
move the item from the one segment in the at least one transport conveyor to the single destination location.

16. The method of claim 15, wherein each of the plurality of storage conveyors is configured to move in two directions, and wherein the method further comprises using the at least one hardware processor to:
determine in which of the two directions to move the one storage conveyor so as to minimize movement; and
control the one storage conveyor to move in the determined direction.

17. The method of claim 15, further comprising using the at least one hardware processor to:
receive the instruction to collect the one or more items from a web application via at least one network; and
provide an identifier of the single destination location to the web application via the at least one network.

18. A non-transitory computer-readable medium having instructions stored therein, wherein the instructions, when executed by a processor of an automated system that comprises at least one transport conveyor and a plurality of storage conveyors, the at least one transport conveyor comprising a belt with a plurality of segments that are each configured to hold at least one item and move in tandem with each other, each of the plurality of storage conveyors comprising a belt with a plurality of segments that are each configured to hold at least one item and move in tandem with each other, and each of the plurality of storage conveyors comprising a portion that is aligned with a portion of the at least one transport conveyor such that items are moveable from any one of the plurality of segments in the storage conveyor to any one of the plurality of segments in the at least one transport conveyor, cause the processor to:

receive an instruction to collect one or more items at a single destination location; and, for each of the one or more items, identify one of the plurality of segments in one of the plurality of storage conveyors on which the item is held, control the one storage conveyor to align the identified segment with one of the plurality of segments in the at least one transport conveyor, move the item from the identified segment in the one storage conveyor onto the one segment in the at least one transport conveyor, control the at least one transport conveyor to align the one segment in the at least one transport conveyor with the single destination location, and move the item from the one segment in the at least one transport conveyor to the single destination location.

19. The non-transitory computer-readable medium of claim 18, wherein the instructions further cause the processor to independently control each of the at least one transport conveyor and the plurality of storage conveyors to move independently from each other.

20. The non-transitory computer-readable medium of claim 18, wherein each of the plurality of storage conveyors is configured to move in two directions, and wherein the instructions further cause the processor to:

determine in which of the two directions to move the one storage conveyor so as to minimize movement; and control the one storage conveyor to move in the determined direction.

* * * * *